US011722773B2

(12) United States Patent
Jun et al.

(10) Patent No.: US 11,722,773 B2
(45) Date of Patent: Aug. 8, 2023

(54) SENSOR ACTUATOR WITH DRIVER AND CAMERA MODULE INCLUDING SAME

(71) Applicant: SAMSUNG ELECTRO-MECHANICS CO., LTD., Suwon-si (KR)

(72) Inventors: Jae Woo Jun, Suwon-si (KR); Yun Kyoung Choi, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 0 days.

(21) Appl. No.: 17/717,725

(22) Filed: Apr. 11, 2022

(65) Prior Publication Data

US 2022/0400205 A1   Dec. 15, 2022

(30) Foreign Application Priority Data

Jun. 14, 2021   (KR) .................. 10-2021-0076846

(51) Int. Cl.
*H04N 23/68* (2023.01)
*H04N 23/54* (2023.01)

(52) U.S. Cl.
CPC ........... *H04N 23/687* (2023.01); *H04N 23/54* (2023.01)

(58) Field of Classification Search
CPC ...... H04N 23/687; H04N 23/54; H04N 23/55; H04N 23/57; G03B 5/04
See application file for complete search history.

(56) References Cited

U.S. PATENT DOCUMENTS

| 8,494,353 | B2 * | 7/2013 | Chung | H04N 23/68 359/557 |
| 8,848,064 | B2 * | 9/2014 | Topliss | H04N 23/68 348/208.7 |
| 2012/0281761 | A1 * | 11/2012 | Wu | H04N 19/40 375/E7.266 |
| 2017/0133950 | A1 * | 5/2017 | Liu | B81B 3/0021 |
| 2018/0171991 | A1 | 6/2018 | Miller et al. | |
| 2020/0174274 | A1 | 6/2020 | Wang et al. | |

FOREIGN PATENT DOCUMENTS

| JP | 2006-38891 A | 2/2006 |
| JP | 2010-81243 A | 4/2010 |
| JP | 2019-512734 A | 5/2019 |
| KR | 10-2016-0032070 A | 3/2016 |
| KR | 10-2020-0066571 A | 6/2020 |
| WO | WO 2017/156462 A1 | 9/2017 |

OTHER PUBLICATIONS

Korean Office Action dated Jul. 6, 2022, in counterpart Korean Patent Application No. 10-2021-0076846 (6 pages in English and 5 pages in Korean).

* cited by examiner

*Primary Examiner* — Padma Haliyur
(74) *Attorney, Agent, or Firm* — NSIP Law

(57) ABSTRACT

A sensor actuator includes an image sensor configured to convert incident light into an electrical signal, and first and second driving parts, configured to move the image sensor in first and second directions, respectively, each of the first and second driving parts includes one or more drivers each includes a wire having a change in length configured to move the image sensor. The one or more drivers in the second driving part is configured to move the image sensor and the first driving part together, and the first and second directions are different from each other.

16 Claims, 10 Drawing Sheets

SENSOR ACTUATOR WITH DRIVER AND CAMERA MODULE INCLUDING SAME

CROSS-REFERENCE TO RELATED APPLICATION(S)

This application claims the benefit under 35 USC 119(a) of Korean Patent Application No. 10-2021-0076846 filed on Jun. 14, 2021, in the Korean Intellectual Property Office, the entire disclosure of which is incorporated herein by reference for all purposes.

BACKGROUND

1. Field

The present disclosure relates to a sensor actuator and a camera module, including the same.

2. Description of Related Art

Recently, cameras have been basically adopted in portable electronic devices such as smartphones, tablet PCs, and laptop PCs, and an autofocusing (AF) function, an optical image stabilization (OIS) function, a zoom function, and the like have been added to the camera provided in the mobile terminals.

In addition, a camera module has been provided with an actuator moving a lens or an image sensor directly or moving a reflective module, including a reflective member in an indirect manner for optical image stabilization. Typically, the actuator is capable of moving the lens, the image sensor, or the reflective module using a driving force caused by a magnet and a coil.

In a case in which a conventional actuator including a magnet and a coil is used to move a plurality of lenses or an image sensor, it is difficult to produce a camera module with a small size due to the sizes of the magnet and the coil included in the actuator.

In addition, with respect to the actuator, including a magnet and a coil, there is concern that an electromagnetic field generated by the magnet and the coil may have an electromagnetic influence on the other components of the camera module or other electronic components outside the camera module.

In addition, in a case in which the actuator, including a magnet and a coil is used to move a plurality of lenses or an image sensor, consumption of power is severe and precise control is difficult.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a sensor actuator includes an image sensor configured to convert incident light into an electrical signal, and first and second driving parts, configured to move the image sensor in first and second directions, respectively, each of the first and second driving parts includes one or more drivers each includes a wire having a change in length configured to move the image sensor. The one or more drivers in the second driving part is configured to move the image sensor and the first driving part together, and the first and second directions are different from each other.

The one or more drivers may further include a lever, connected to the wire, configured to rotate around a rotation axis based on the change in length of the wire to move the image sensor, and a lever shaft forming the rotation axis.

A moving distance of the image sensor based on the change in length of the wire may be greater than an amount of the change in length of the wire.

The lever may include a connection portion connected to the wire, and a contact portion contacting a plate provided with the image sensor. The rotation axis may be between the connection portion and the contact portion.

In the lever, a distance from the connection portion to the rotation axis may be smaller than a distance from the contact portion to the rotation axis.

The contact portion of the lever may have a curved surface.

The first direction may be a first axis perpendicular to an optical axis, and the second direction may be a second axis perpendicular to both the optical axis and the first axis.

The first driving part may include a movable plate configured to movably accommodate the image sensor, a first driver, disposed on the movable plate, configured to move the image sensor in a positive direction of the first axis, and a second driver, disposed on the movable plate, configured to move the image sensor in a negative direction of the first axis.

The sensor actuator may further include a sensor plate surrounding a perimeter of the image sensor. The movable plate may include a first guide portion extending in the direction of the first axis. The first guide portion may include a first extension portion extending from the movable plate in a direction of the optical axis, and a first bent portion bent from the first extension portion in a direction intersecting the optical axis. At least a portion of the sensor plate may be inserted between the first bent portion and the movable plate to move the sensor plate in the direction of the first axis.

The sensor actuator may further include a friction reducing member on the portion of the sensor plate inserted between the first bent portion and the movable plate.

The second driving part may include a base configured to movably accommodate the movable plate, a third driver, disposed on the base, configured to move the movable plate in a positive direction of the second axis, and a fourth driver, disposed on the base, configured to move the movable plate in a negative direction of the second axis.

The base may include a second guide portion extending in the direction of the second axis. The second guide portion may include a second extension portion extending from the base in a direction of the optical axis, and a second bent portion bent from the second extension portion in a direction intersecting the optical axis. At least a portion of the movable plate may be inserted between the second bent portion and the base to move the movable plate in the direction of the second axis.

The sensor actuator may further include a friction reducing member disposed on the portion of the movable plate inserted between the second bent portion and the base.

The first, second, third, and fourth drivers may be driven independently of each other.

In another general aspect, a camera module includes a lens module including one or more lenses, and a sensor actuator, configured to receive incident light passing through the lens module. The sensor actuator including an image sensor, a movable plate, and a base stacked in a direction of an optical axis, a first wire configured to move the image sensor with respect to the movable plate in a direction of a first axis perpendicular to the optical axis, and a second wire configured to move the movable plate with respect to the base in a direction of a second axis perpendicular to both the optical axis and the first axis. The first wire is disposed on the movable plate, and the second wire is disposed on the base.

At least a portion of the first wire may be disposed to extend in the direction of the second axis, and at least a portion of the second wire may be disposed to extend in the direction of the first axis.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
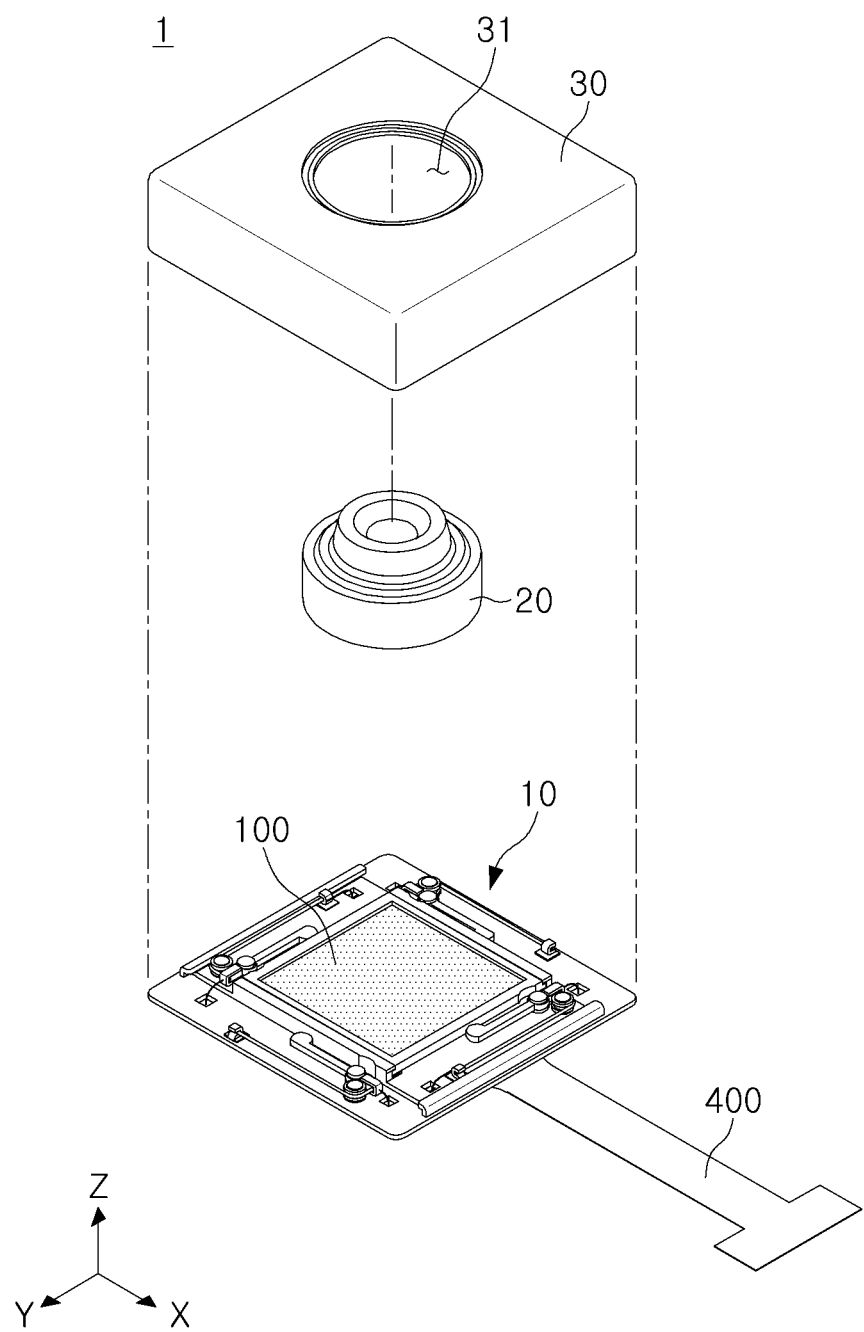
FIG. 1 is an exploded perspective view of an example of a camera module, according to one or more embodiments.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after understanding of the disclosure of this application may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

FIG. 1 is an exploded perspective view of an example of a camera module 1 according to one or more embodiments.

The camera module 1, according to one or more embodiments, may be provided in a portable electronic device such as a mobile communication terminal, a smartphone, or a tablet PC.

The camera module 1, according to one or more embodiments, may include a lens module 20 including one or more lenses, a sensor actuator 10 provided with an image sensor 100 converting light incident through the lens module 20 into an electrical signal, and a case 30 covering the lens module 20 and the image sensor 100.

One or more lenses for imaging a subject may be accommodated in the lens module 20. In a case in which a plurality of lenses are arranged, the plurality of lenses may be mounted inside the lens module 20 and aligned in an optical axis direction (e.g., a Z-axis direction). The lens module 20 may include one or more cylindrical lens barrels, each hollow.

The camera module 1, according to one or more embodiments, may include a lens driver (not shown) moving the lens module 20. The lens driver (not shown) may move the lens module 20 in the direction of an optical axis (Z-axis) to perform a focusing function or a zoom function, or move the lens module 20 in a direction (e.g., X-axis or Y-axis) perpendicular to the optical axis (Z-axis) to perform an optical image stabilization function. Alternatively, the lens driver (not shown) may rotate the lens module 20 about the optical axis (Z-axis), or rotate the lens module 20 about an axis (e.g., X-axis or Y-axis) perpendicular to the optical axis (Z-axis) to perform an optical image stabilization function. That is, the lens driver (not shown) may include a focusing unit performing focusing and an optical image stabilization unit performing optical image stabilization.

The sensor actuator 10 may include an image sensor 100 and one or more driving parts (e.g., 200 and 300 in FIG. 2) moving the image sensor 100.

The image sensor 100 may convert light incident through the lens module 20 into an electrical signal. For example, the image sensor 100 may include a charge coupled device (CCD) or a complementary metal-oxide semiconductor (CMOS). The image sensor 100 may be electrically connected to a circuit board 400, and accordingly, the electrical signal converted by the image sensor 100 may be output to the outside through the circuit board 400.

The sensor actuator 10, according to one or more embodiments, may further include a filter (not shown) provided adjacent to the image sensor 100. For example, the sensor actuator 10 may be provided with an infrared filter (not shown), and the infrared filter (not shown) may be provided to block light having a wavelength in an infrared region with respect to the light incident through the lens module 20.

The sensor actuator 10 may be aligned with the lens module 20 in the optical axis direction (Z-axis direction). The sensor actuator 10 may be provided with the image sensor 100 to convert light incident through the lens module 20 into an electrical signal. The sensor actuator 10 may move the image sensor 100 in the optical axis direction (Z-axis direction) or in a direction (e.g., X-axis or Y-axis direction) intersecting the optical axis to perform an optical image stabilization function. For example, the sensor actuator 10 may move the image sensor 100 on a plane (X-Y plane) perpendicular to the optical axis to perform an optical image stabilization function. Alternatively, the sensor actuator 10 may rotate the image sensor 100 about the optical axis (Z-axis), or rotate about an axis (X-axis or Y-axis) perpendicular to the optical axis (Z-axis) to perform an optical image stabilization function.

The case 30 may be provided to cover the upper sides of the lens module 20 and the sensor actuator 10. An incident hole 31 may be formed in an upper surface of the case 30, and light incident through the incident hole 31 may be incident on the lens module 20 accommodated in the case.

Hereinafter, the sensor actuator 10, according to one or more embodiments, will be described with reference to FIG. 2.

Figure 2:
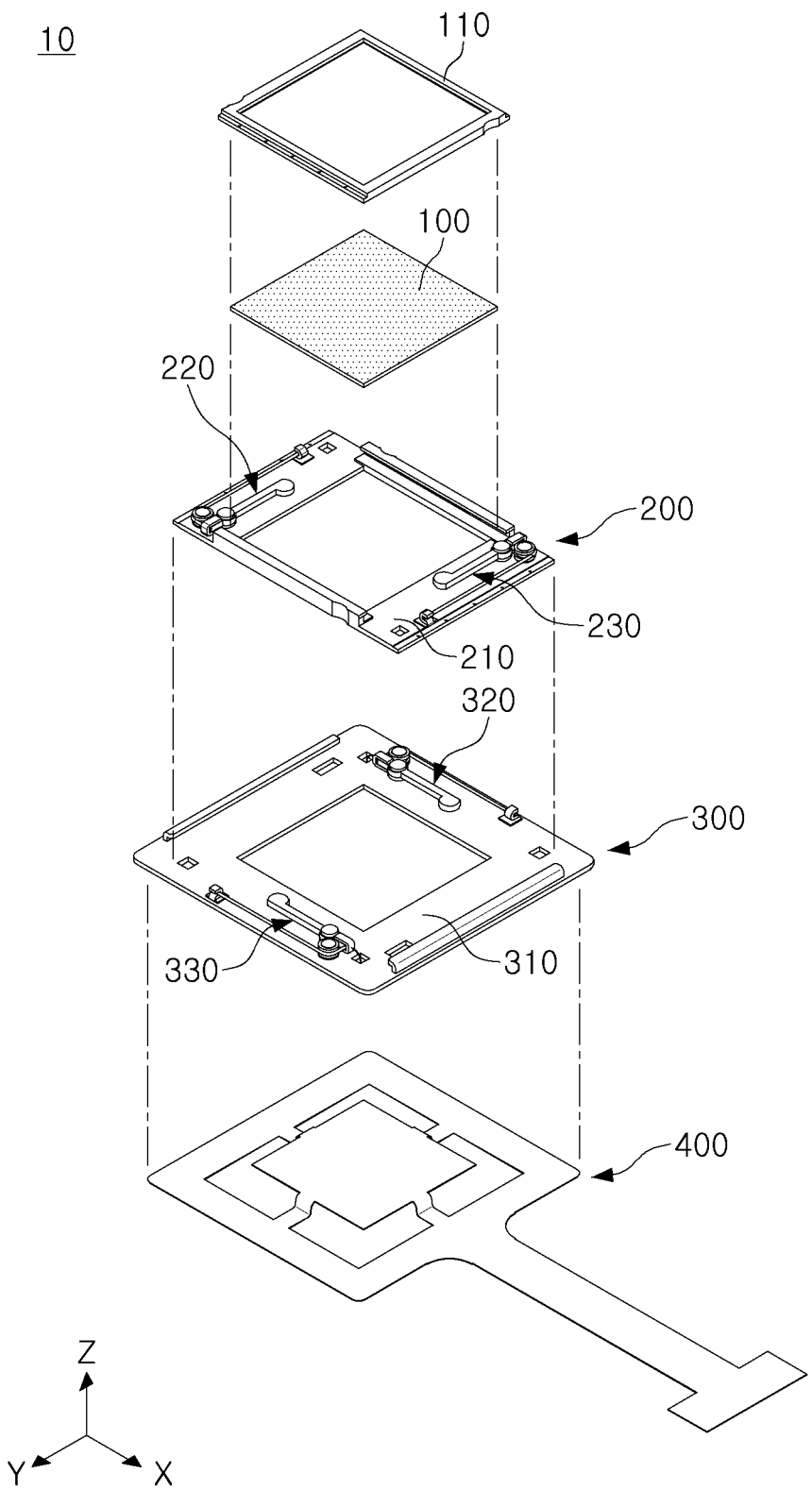
FIG. 2 is an exploded perspective view of an example of a sensor actuator, according to one or more embodiments.

FIG. 2 is an exploded perspective view of an example of a sensor actuator 10 according to one or more embodiments.

The sensor actuator 10, according to one or more embodiments, may perform an optical image stabilization function by moving an image sensor 100 on a plane (e.g., X-Y plane) perpendicular to an optical axis to correspond to the shaking of the camera module (1 in FIG. 1).

The sensor actuator 10 may include an image sensor 100, a sensor plate 110 surrounding the image sensor 100, a first driving part 200 in which the sensor plate 110 is movably provided, a second driving part 300 in which the first driving part 200 is movably provided, and a circuit board 400 electrically connected to the image sensor 100.

In one or more embodiments, the image sensor 100, the first driving part 200, the second driving part 300, and the circuit board 400 may be provided side by side along the optical axis direction (e.g., Z-axis direction) of the lens module (e.g., 20 in FIG. 1). For example, as illustrated in FIG. 2, the image sensor 100 may be provided on an upper side of the first driving part 200, the first driving part 200 may be provided on an upper side of the second driving part 300, the second driving part 300 may be provided on an upper side of the circuit board 400. That is, the image sensor 100, the first driving part 200, the second driving part 300, and the circuit board 400 may be sequentially stacked along the optical axis direction (Z-axis direction).

The image sensor 100 may be movable with respect to the first driving part 200 in combination with the sensor plate 110. For example, as illustrated in FIG. 2, the sensor plate 110, including the image sensor 100 may be movable in a direction (e.g., X-axis or Y-axis direction) perpendicular to the optical axis on an upper surface of the first driving part 200. In the sensor actuator 10, according to one or more embodiments, the sensor plate 110 may be provided integrally with the image sensor 100.

The first driving part 200 may move the sensor plate 110 provided with the image sensor 100 in a direction of a first axis (e.g., X-axis) perpendicular to the optical axis (Z-axis). The first driving part 200 may include a movable plate 210 in which the image sensor 100 is movably accommodated, and one or more drivers 220 and 230 moving the image sensor 100.

The second driving part 300 may move the first driving part 200 in a direction different from the first axis (X-axis). For example, the second driving part 300 may move the first driving part 200 in a direction of a second axis (e.g., Y-axis) perpendicular to both the optical axis (Z-axis) and the first axis (X-axis). The second driving part 300 may include a base 310 in which the movable plate 210 of the first driving part 200 is movably accommodated, and one or more drivers 320 and 330 moving the movable plate 210. In one or more embodiments, the second driving part 300 may move the image sensor 100 together with the first driving part 200. That is, when the first driving part 200 is moved in the direction of the second axis (Y-axis) by the second driving part 300, the image sensor 100 accommodated in the first driving part 200 may also move together in the same direction as the first driving part 200.

The sensor actuator 10, according to one or more embodiments, may perform an optical image stabilization function by moving the image sensor 100 in the direction of the first axis (X-axis) or the second axis (Y-axis) perpendicular to the optical axis (Z-axis) through the first driving part 200 and the second driving part 300.

The circuit board 400 may be provided on a lower side of the second driving part 300. The circuit board 400 may be electrically connected to the image sensor 100 to receive image information from the image sensor 100. In addition, the circuit board 400 may be electrically connected to one or more drivers 220 and 230 included in the first driving part 200 and one or more drivers 320 and 330 included in the second driving part 300 to apply a current or voltage or transmit a control signal to the drivers 220, 230, 320, and 330.

Hereinafter, a first driving part 200, according to one or more embodiments, will be described with reference to FIG. 3.

Figure 3:
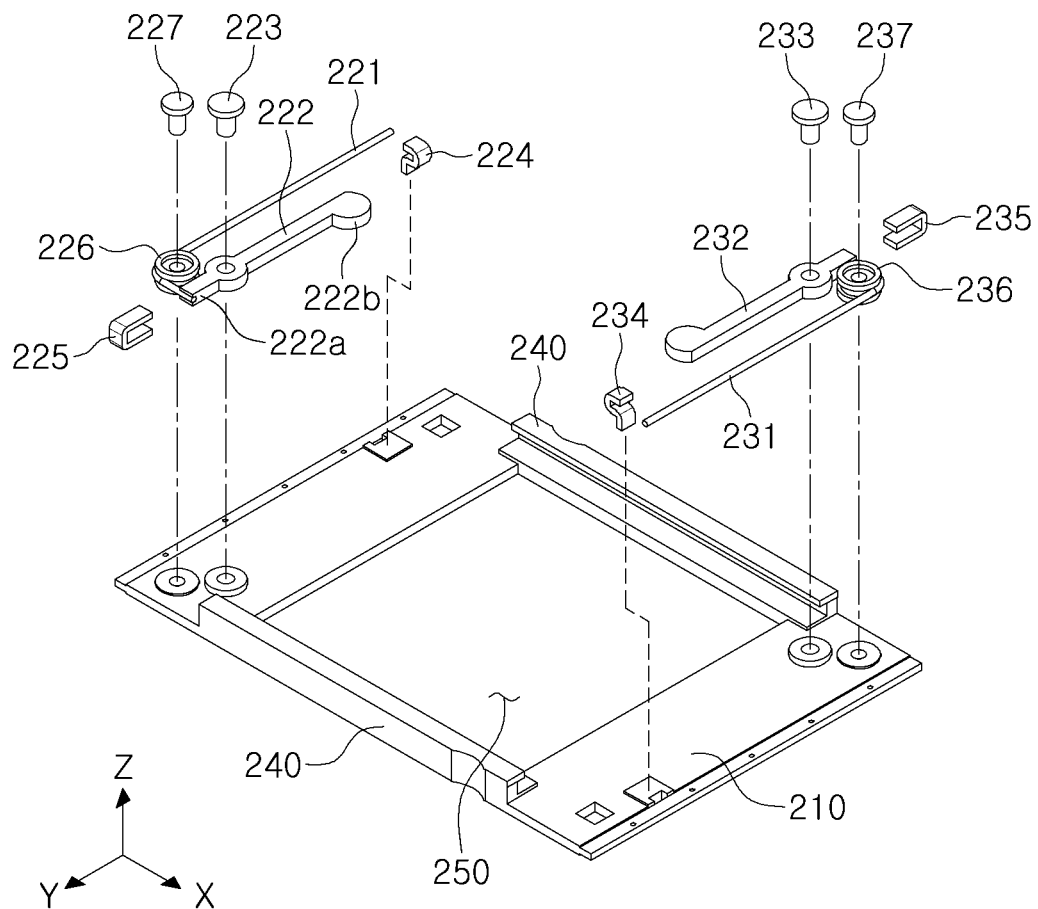
FIG. 3 is an exploded perspective view of an example of a first driving part included in the sensor actuator, according to one or more embodiments.

FIG. 3 is an exploded perspective view of the first driving part 200 included in the sensor actuator (10 in FIG. 1 or 2) according to one or more embodiments. The first driving part 200 illustrated in FIG. 3 includes the features of the first driving part (200 in FIG. 2) described above with reference to FIG. 2, and thus, the description thereof will not be repeated.

The first driving part 200, according to one or more embodiments, may move the image sensor (100 in FIG. 1 or 2) or the sensor plate (110 in FIG. 2) provided with the image sensor (100 in FIG. 1 or 2) in a direction of a first axis (e.g., X-axis) perpendicular to an optical axis (Z-axis).

The first driving part 200 may include a movable plate 210 in which the sensor plate (110 in FIG. 2) is accommodated, and one or more drivers 220 and 230 provided in the movable plate 210 to move the sensor plate (110 in FIG. 2). The drivers 220 and 230 may include wires 221 and 231, each having a length that changes when a current or voltage is applied to any one of the drivers 220 and 230, and the image sensor (100 in FIG. 1 or 2) may be moved by a driving force generated according to the change in length of the wire 221 or 231.

In one or more embodiments, the first driving part 200 may include a movable plate 210. In the movable plate 210, the image sensor (100 in FIG. 1 or 2) or the sensor plate (110 in FIG. 2) provided with the image sensor (100 in FIG. 1 or 2) may be movably accommodated. For example, as illustrated in FIG. 3, the movable plate 210 may include a first guide portion 240 extending in one direction (X-axis direction), and at least a portion of the sensor plate (110 in FIG. 2) may be inserted into the first guide portion 240 to slidably move on an upper surface of the movable plate 210 along the extending direction of the first guide portion 240. The movable plate 210 may include one or more first guide portions 240. For example, the movable plate 210 may include two or more first guide portions 240 provided at opposite edges of the movable plate 210, each extending in one direction (X-axis direction).

In one or more embodiments, the movable plate 210 may be provided as a plate-shaped member having at least a partial surface perpendicular to the optical axis (Z-axis). Accordingly, the sensor plate (110 in FIG. 2) may move along with the movable plate 210 in a direction (e.g., X-axis direction) perpendicular to the optical axis (Z-axis). Meanwhile, the movable plate 210 is not limited to the plate shape, and may be provided in various shapes.

In one or more embodiments, the movable plate 210 may have a first hollow 250 in a portion facing the image sensor (100 in FIG. 1 or 2). The image sensor (100 in FIG. 1 or 2) accommodated on the upper surface of the movable plate 210 may be accessed through the first hollow 250 from a lower side of the movable plate 210. For example, the circuit board included in the camera module (1 in FIG. 1) may be provided on a lower side of the first driving part 200, and electrically connected to the image sensor (100 in FIG. 1 or 2) through the first hollow 250 of the first driving part 200.

The first driving part 200, according to one or more embodiments, may include one or more drivers 220 and 230. For example, as illustrated in FIG. 3, the first driving part 200 may include a first driver 220 and a second driver 230 provided on both sides of the sensor plate (110 in FIG. 2), respectively.

In one or more embodiments, each of the drivers of the first driving part 200 may be provided at a different position from the first guide portions 240 of the first driving part 200. For example, the first driver 220 and the second driver 230 may be provided at both side edges of the movable plate 210 where the first guide portions 240 are not provided, respectively. That is, as illustrated in FIG. 3, when the movable plate 210 has a rectangular upper surface, the first guide portions 240 may be provided on one side and the opposite side thereof, respectively, and the first driver 220 and the second driver 230 may be provided on another side adjacent to the one side and the opposite side thereof, respectively.

Any one of the drivers 220 and 230 may move or rotate the image sensor (100 in FIG. 1 or 2) with respect to the movable plate 210. For example, the first driver 220 may move the image sensor (100 in FIG. 1 or 2) or the sensor plate (110 in FIG. 2) provided with the image sensor (100 in FIG. 1 or 2) with respect to the movable plate 210 in the direction of the first axis (X-axis) perpendicular to the optical axis (Z-axis).

The first driver 220, according to one or more embodiments, may include a first wire 221 a length of which changes when a voltage is applied thereto, a first lever 222 connected to the first wire 221 and rotating about a predetermined rotation axis according to the change in length of the first wire 221, and a first lever shaft 223 forming the rotation axis of the first lever 222.

The current or voltage may be applied to the first wire 221 from the outside of the first driving part 200, and the first wire 221 may be provided to have a length that changes as the current or voltage is applied thereto. For example, the first wire 221 may include a shape memory alloy having a length that changes when a voltage or a current is applied thereto. In one or more embodiments, a length change amount of the first wire 221 may be proportional to a magnitude of the voltage or current applied to the first wire 221, or may be proportional to a time period for which the voltage or current is applied to the first wire 221.

At least a portion of the first wire 221, according to one or more embodiments, may extend in a direction (e.g., Y-axis direction) perpendicular to the optical axis (Z-axis), and may contract in the direction (e.g., Y-axis direction) perpendicular to the optical axis (Z-axis) when a voltage is applied.

One end of the first wire 221 may be fixed to the movable plate 210 by a first fixing member 224. In one or more embodiments, the first fixing member 224 may be formed of a conductive material, and accordingly, one end of the first wire 221 may be electrically connected to an external power source (not shown) via the first fixing member 224.

The other end of the first wire 221 may be connected to the first lever 222. In one or more embodiments, a first connecting member 225 binding the other end of the first wire 221 and the first lever 222 to each other may be further provided. The first connecting member 225 may be formed of a conductive material, and accordingly, the other end of the first wire 221 may be electrically connected to an external power source (not shown) via the first connecting member 225. That is, each of one end and the other end of the first wire 221 may be electrically connected to an external power source (not shown), so that a current or voltage is applied thereto. When the voltage is applied to the first wire 221 and the length of the first wire 221 contracts, the tension of the first wire 221 may be conveyed to the first lever 222 connected to the first wire 221 accordingly.

In one or more embodiments, the first lever 222 may be rotatably supported by the first lever shaft 223 on the movable plate 210.

The first lever 222 may be provided as a rod-shaped member with rigidity. For example, as illustrated in FIG. 3, the first lever 222 may be provided as a rigid member continuing from a connection portion 222a connected to the first wire 221 to a contact portion 222b contacting the sensor plate (110 in FIG. 2). However, the shape of the first lever 222 illustrated in FIG. 3 is merely an example, and the shape of the first lever 222 may be provided in various ways.

The first lever 222 may rotate around the rotation axis formed by the first lever shaft 223. For example, as illustrated in FIG. 3, the first lever shaft 223 may be inserted into the movable plate 210 by penetrating through the first lever 222, and accordingly, the first lever 222 may rotate around the first lever shaft 223 clockwise or counterclockwise. As illustrated in FIG. 3, the first lever shaft 223 may be a separate member inserted into the first lever 222. However, this is merely an example, and the first lever shaft 223 may be provided integrally with the first lever 222. That is, the first lever shaft 223 may be integrally provided with the first lever 222, and rotatably inserted into the movable plate 210.

The first lever 222 may include a connection portion 222a connected to the first wire 221. The connection portion 222a of the first lever 222 may be connected to the first wire 221 through the first connecting member 225. The first connecting member 225 may be provided in the shape of a clip or clamp fitted onto the connection portion 222a of the first lever 222 in a state where the connection portion 222a of the first lever 222 and the first wire 221 are in contact with each other.

The contact portion 222b of the first lever 222 may be provided to contact the image sensor (100 in FIG. 1 or 2) or the sensor plate (110 in FIG. 2) provided with the image sensor (100 in FIG. 1 or 2). In one or more embodiments, the contact portion 222b of the first lever 222 may move the image sensor (100 in FIG. 1 or 2) or the sensor plate (110 in FIG. 2) by pushing or pulling it according to a change in length of the first wire 221. For example, when the first wire 221 contracts and rotates the connection portion 222a of the first lever 222, the contact portion 222b of the first lever 222 may also rotate in the same torque direction to push and move the image sensor (100 in FIG. 1 or 2) or the sensor plate (110 in FIG. 2).

In one or more embodiments, a portion of the first lever 222 contacting the image sensor (100 in FIG. 1 or 2) or the sensor plate (110 in FIG. 2) may have a curved surface. For example, as illustrated in FIG. 3, the contact portion 222b of the first lever 222 contacting the sensor plate (110 in FIG. 2) may have a curved surface. Accordingly, the curved surface of the contact portion 222b may smoothly press the sensor plate (110 in FIG. 2) while the first lever 222 rotates, or may make it possible to change the moving distance of the sensor plate (110 in FIG. 2) in proportion to a rotating amount of the first lever 222.

In one or more embodiments, the first wire 221 may be connected to the first lever 222 in a state where at least a portion thereof is wound around a first roller 226. For example, as illustrated in FIG. 3, the first wire 221 may extend in a state where at least a portion of the first wire 221 is wound around the first roller 226 between one end thereof connected to the first fixing member 224 and the other end thereof connected to the first connecting member 225. Accordingly, an extending direction of the first wire 221 may be changed while the first wire 221 passes through the first roller 226.

The first roller 226 may be rotatably provided on the movable plate 210, and a portion of the first wire 221 may be wound around the first roller 226 to be rotatable to correspond to a change in length of the first wire 221. A rotation axis of the first roller 226 may be formed by a first roller shaft 227. The first roller shaft 227 may be inserted into the movable plate 210 by penetrating through the first roller 226. However, the first roller shaft 227 may be formed integrally with the first roller 226.

In one or more embodiments, the first roller 226 may be provided adjacent to the connection portion 222a of the first lever 222. Accordingly, a portion of the first wire 221 extending from the first roller 226 to the connection portion 222a of the first lever 222 may be substantially perpendicular to the first lever 222. As the first wire 221 is connected to the first lever 222 perpendicularly, a tension caused by contracting a length of the first wire 221 may generate a great torque to the first lever 222.

In one or more embodiments, the first driving part 200 may further include a second driver 230 independent from the first driver 220. The second driver 230 may move the image sensor (100 in FIG. 1 or 2) or the sensor plate (110 in FIG. 2) in the direction of the first axis (X-axis) perpendicular to the optical axis (Z-axis).

In one or more embodiments, the second driver 230 may have the same structure as the first driver 220. That is, the second driver 230 may include a second wire 231, a length of which changes when electric power is applied thereto, a second lever 232 connected to the second wire 231 and provided to be rotatable, and a second lever shaft 233 forming a rotation axis of the second lever 232. In addition, the second driver 230 may include a second fixing member 234 capable of fixing the second wire 231 to the movable plate 210 and a second connecting member 235 capable of binding the second lever 232 and the second wire 231 to each other. In addition, the second driver 230 may further include a second roller 236 around which at least a portion of the second wire 231 is wound, and a second roller shaft 237 forming a rotation axis of the second roller 236. Here, the second wire 231, the second lever 232, the second lever shaft 233, the second fixing member 234, the second connecting member 235, the second roller 236, and the second roller shaft 237 may have the same structures as the first wire 221, the first lever 222, the first lever shaft 223, the first fixing member 224, the first connecting member 225, the first roller 226, and the first roller shaft 227 of the first driver 220 described above, respectively. Thus, the description of the above-mentioned components of the second driver 230 overlapping that of the first driver 220 will not be repeated, and only differences of the second driver 230 from the first driver 220 will be described below.

In one or more embodiments, the first driving part 200 may include a second driver 230 provided at a different position from the first driver 220. For example, as illustrated in FIG. 3, the first driving part 200 may include a first driver 220 and a second driver 230 on both sides of the sensor plate (110 in FIG. 2), respectively. In one or more embodiments, the second wire 231 of the second driver 230 and the first wire 221 of the first driver 220 may be provided at opposite edges of the movable plate 210, respectively, and may extend in a direction to be parallel to each other.

As the first driver 220 and the second driver 230 are provided at different positions, driving directions of the first driver 220 and the second driver 230 may also be different from each other.

In one or more embodiments, the second driver 230 and the first driver 220 may move the image sensor (100 in FIG. 1 or 2) in opposite directions. For example, the first driver 220 may move the image sensor (100 in FIG. 1 or 2) in a positive direction of the first axis (X-axis), and the second driver 230 may move the image sensor (100 in FIG. 1 or 2) in a negative direction of the first axis (X-axis). That is, the image sensor (100 in FIG. 1 or 2) may be moved in both the positive direction and the negative direction of the first axis (X-axis) by the first driver 220 and the second driver 230.

In one or more embodiments, rotating directions of the first lever 222 and the second lever 232 according to the contraction of the first wire 221 and the second wire 231 may be opposite to each other. For example, as the first wire 221 contracts, the first lever 222 rotates counterclockwise to move the image sensor (100 in FIG. 1 or 2) in the positive direction of the first axis (X-axis). On the other hand, as the second wire 231 contracts, the second lever 232 rotates clockwise to move the image sensor (100 in FIG. 1 or 2) in the negative direction of the first axis (X-axis). That is, the image sensor (100 in FIG. 1 or 2) may be moved in either the positive direction or the negative direction of the first axis (X-axis) by contracting any one of the first wire 221 and the second wire 231.

In one or more embodiments, the first driver 220 and the second driver 230 may be controlled independently of each other. For example, only one of the first driver 220 and the second driver 230 may be driven, or both the first driver 220 and the second driver 230 may be driven sequentially. In this way, the first driving part 200 may perform an optical image stabilization function by appropriately moving the image sensor (100 in FIG. 1 or 2) in a direction (e.g., X-axis direction) perpendicular to the optical axis (Z-axis).

In one or more embodiments, the sensor actuator (10 in FIG. 1 or 2) may further include a second driving part (300 in FIG. 2) capable of moving the image sensor (100 in FIG. 1 or 2) in a different direction (e.g., Y-axis direction) from the first driving part 200.

Hereinafter, a second driving part 300 will be described with reference to FIG. 4.

Figure 4:
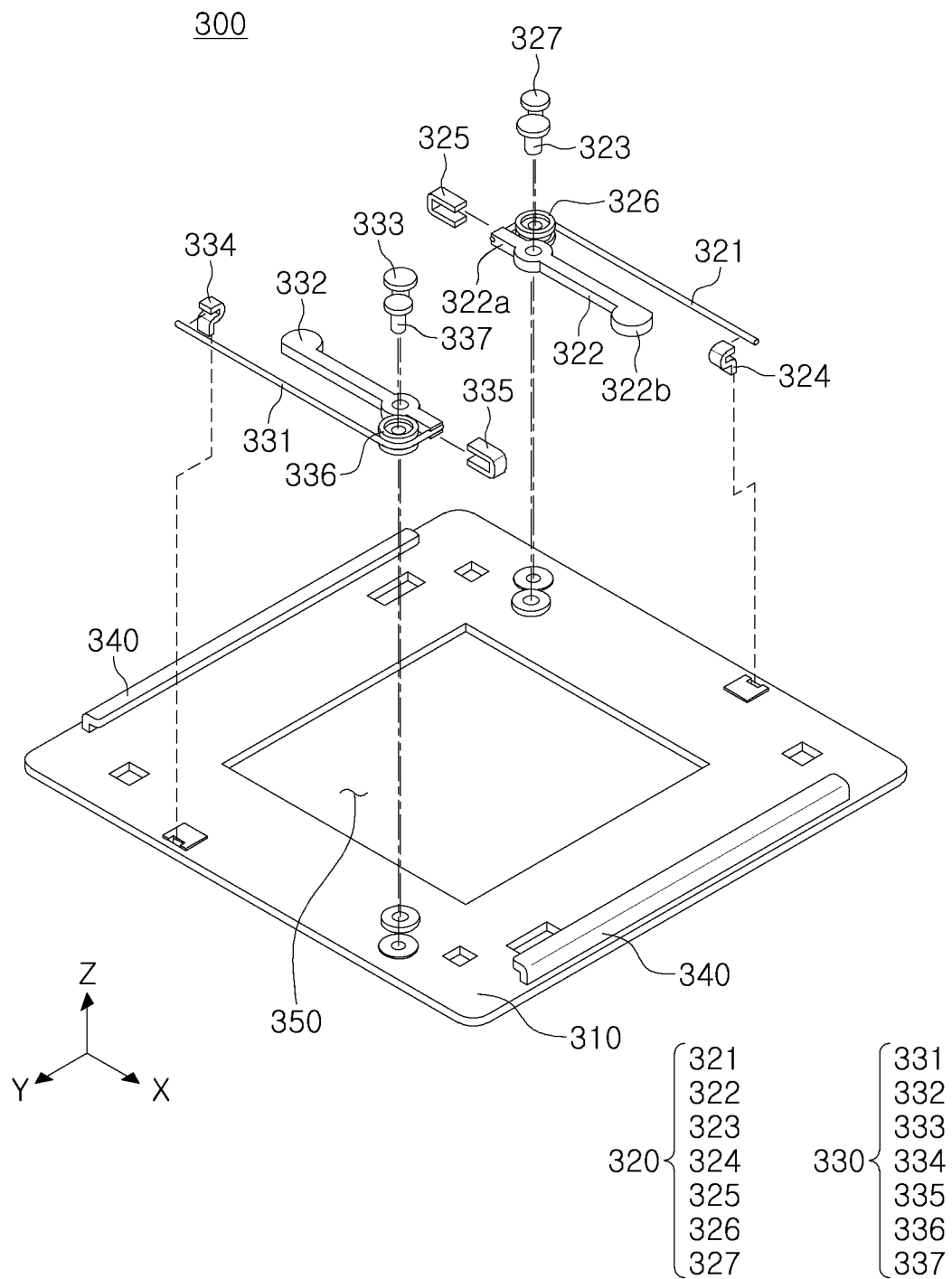
FIG. 4 is an exploded perspective view of an example of a second driving part included in the sensor actuator, according to one or more embodiments.

FIG. 4 is an exploded perspective view of an example of a second driving part 300 included in the sensor actuator (10 in FIG. 1 or 2) according to one or more embodiments. A first driving part illustrated in FIG. 4 corresponds to the first driving part (200 in FIG. 3) described above with reference to FIG. 3. Thus, for the first driving part to be described below, the description of the first driving part (200 in FIG. 3) provided above with reference to FIG. 3 may be referred to.

The second driving part 300, according to one or more embodiments, may move the first driving part (200 in FIG. 3) in a direction (e.g., Y-axis direction) perpendicular to the optical axis (Z-axis). For example, the second driving part 300 may move the first driving part (200 in FIG. 3) in the direction of a second axis (Y-axis) perpendicular to both the optical axis (Z-axis) and the first axis (X-axis) perpendicular to the optical axis (Z-axis). As the first driving part (200 in FIG. 3) is moved in the direction of the second axis (Y-axis) by the second driving part 300, the image sensor (100 in FIG. 1 or 2) accommodated in the first driving part (200 in FIG. 3) may also be moved in the direction of the second axis (Y-axis) together with the first driving part (200 in FIG. 3). That is, the second driving part 300 may move the first driving part (200 in FIG. 3) and the image sensor (100 in FIG. 1 or 2) together in the direction of the second axis (Y-axis).

The second driving part 300, according to one or more embodiments, may include a base 310 in which the movable plate (210 in FIG. 3) of the first driving part (200 in FIG. 3) is accommodated, and one or more drivers 320 and 330 provided on the base 310 to move the movable plate (210 in FIG. 3). The drivers 320 and 330 may include wires 321 and 331, each having a length that changes when a current or voltage is applied to any one of the drivers 320 and 330, and the movable plate (210 in FIG. 3) may be moved by a driving force generated according to the change in length of the wire 321 or 331.

In one or more embodiments, the second driving part 300 may include a base 310. The image sensor (100 in FIG. 1 or 2) or the sensor plate (110 in FIG. 2) provided with the image sensor (100 in FIG. 1 or 2), and the first driving part (200 in FIG. 3) may be movably accommodated in the base 310. For example, as illustrated in FIG. 4, the base 310 may include a second guide portion 340 extending in one direction (Y-axis direction), and at least a portion of the movable plate (210 in FIG. 3) may be inserted into the second guide portion 340 to slidably move on an upper surface of the base 310 along the extending direction of the second guide portion 340. The base 310 may include one or more second guide portions 340. For example, the base 310 may include two or more second guide portions 340 provided at opposite edges of the base 310, each extending in one direction (Y-axis direction).

In one or more embodiments, the direction in which the second guide portions 340 extend may be perpendicular to the direction in which the first guide portions (240 in FIG. 3) extend. For example, the first guide portions (240 in FIG. 3) may extend in the direction of the first axis (X-axis) perpendicular to the optical axis (Z-axis), and the second guide portions 340 may extend in the direction of the second axis (Y-axis) perpendicular to both the optical axis (Z-axis) and the first axis (X-axis). Since the first guide portions (240 in FIG. 3) and the second guide portions 340 extend in directions perpendicular to each other, respectively, the sensor plate (110 in FIG. 2) and the movable plate (210 in FIG. 3) may move in directions perpendicular to each other along the first guide portions (240 in FIG. 3) and the second guide portions 340, respectively.

In one or more embodiments, the base 310 may be provided as a plate-shaped member having at least a partial surface perpendicular to the optical axis (Z-axis). Accordingly, the movable plate (210 in FIG. 3) may move along with the base 310 in a direction perpendicular to the optical axis (Z-axis) direction. Meanwhile, the base 310 is not limited to the plate shape, and may be provided in various shapes.

In one or more embodiments, the base 310 may have a second hollow 350 in a portion facing the image sensor (100 in FIG. 1 or 2). The second hollow 350 of the base 310 and the first hollow (250 in FIG. 3) of the movable plate (210 in FIG. 3) may communicate with each other. Accordingly, the image sensor (100 in FIG. 1 or 2) accommodated on the upper surface of the movable plate (210 in FIG. 3) may be accessed through the first hollow (250 in FIG. 3) and the second hollow 350 from a lower side of the base 310. For example, the circuit board (400 in FIG. 1 or 2) included in the sensor actuator (10 in FIG. 1 or 2) may be provided on a lower side of the second driving part 300, and electrically connected to the image sensor (100 in FIG. 1 or 2) through the first hollow (250 in FIG. 3) of the first driving part (200 in FIG. 3) and the second hollow 350 of the second driving part 300.

The second driving part 300, according to one or more embodiments, may include one or more drivers 320 and 330. For example, as illustrated in FIG. 4, the second driving part 300 may include a third driver 320 and a fourth driver 330 provided on both sides of the base 310, respectively.

In one or more embodiments, any one of the drivers 320 and 330 included in the second driving part 300 may move or rotate the first driving part (200 in FIG. 3) with respect to the base 310. For example, the third driver 320 may move the first driving part (200 in FIG. 3) and the image sensor (100 in FIG. 1 or 2) together with respect to the base 310 in the direction of the first axis (X-axis) perpendicular to the optical axis (Z-axis). That is, the movable plate (210 in FIG. 3) and the first and second drivers included in the first driving part (200 in FIG. 3), and the image sensor (100 in FIG. 1 or 2) accommodated in the movable plate (210 in FIG. 3) may be moved together in the direction of the first axis (X-axis) through a driving force generated by the third driver 320.

In one or more embodiments, any one of the drivers 320 and 330 included in the second driving part 300 may have the same structure as the first driver (220 in FIG. 3) described above with reference to FIG. 3. For example, the third driver 320 and the fourth driver 330 of the second driving part 300 may have the same structure as the first driver (220 in FIG. 3). That is, the third driver 320, according to one or more embodiments, may include a third wire 321 a length of which changes when a voltage is applied thereto, a third lever 322 connected to the third wire 321 and rotating about a predetermined rotation axis according to the change in length of the third wire 321, and a third lever shaft 323 forming a rotation axis of the third lever 322. In addition, the third lever 322 of the third driver 320 may include a connection portion 322a and a contact portion 322b, and a third connecting member 325 may be coupled to the connection portion 322a of the third lever 322. The third wire 321 may be fixed to the base 310 by a third fixing member 324. The third driver 320 may further include a third roller 326 around which at least a portion of the third wire 321 is wound, and a third roller shaft 327 forming a rotation axis of the third roller 326.

Similarly, the fourth driver 330, according to one or more embodiments, may include a fourth wire 331 a length of which changes when a voltage is applied thereto, a fourth lever 332 connected to the fourth wire 331 and rotating about a predetermined rotation axis according to the change in length of the fourth wire 331, and a fourth lever shaft 333 forming a rotation axis of the fourth lever 332. In addition, a fourth connecting member 335 binding the fourth wire 331 and the fourth lever 332 of the fourth driver 330 to each other may be provided. The fourth wire 331 may be fixed to the base 310 by a fourth fixing member 334. The fourth driver 330 may further include a fourth roller 336 around which at least a portion of the fourth wire 331 is wound, and a fourth roller shaft 337 forming a rotation axis of the fourth roller 336.

Hereinafter, the description of the above-mentioned components of the third and fourth drivers 320 and 330 overlapping that of the first driver (220 in FIG. 3) will not be repeated, and only differences of the third and fourth drivers 320 and 330 from the first driver (220 in FIG. 3) will be described.

At least one of the drivers 320 and 330 included in the second driving part 300, according to one or more embodiments, may be provided on the base 310. For example, as illustrated in FIG. 4, the third driver 320 and the fourth driver 330 may be provided at opposite edges of the base 310, respectively.

In one or more embodiments, each of the drivers 320 and 330 of the second driving part 300 may be provided at a different position from the second guide portions 340 of the second driving part 300. For example, the third driver 320 and the fourth driver 330 may be provided at the edges of the base 310 where the second guide portions 340 are not provided. As illustrated in FIG. 4, when the base 310 has a rectangular upper surface, the second guide portions 340 may be provided on one side and the opposite side thereof, respectively, and the third driver 320 and the fourth driver 330 may be provided on another side adjacent to the one side and the opposite side thereof, respectively.

In one or more embodiments, the third driver 320 and the fourth driver 330 of the second driving part 300 may be provided adjacent to the first guide portions (240 in FIG. 3), respectively. Accordingly, the third driver 320 and the fourth driver 330 may push or pull portions where the first guide portions (240 in FIG. 3) are formed of the first driving part (200 in FIG. 3), respectively, to move the first driving part (200 in FIG. 3).

In one or more embodiments, the driving directions of the third driver 320 and the fourth driver 330 may be different from each other. In other words, the third driver 320 and the fourth driver 330 may move the image sensor (100 in FIG. 1 or 2) or the first driving part (200 in FIG. 3) in opposite directions. For example, the third driver 320 may push the image sensor (100 in FIG. 1 or 2) for movement in a positive direction of the second axis (Y-axis), and the fourth driver 330 may push the image sensor (100 in FIG. 1 or 2) for movement in a negative direction of the second axis (Y-axis). That is, the first driving part (200 in FIG. 3) and the image sensor (100 in FIG. 1 or 2) accommodated in the first driving part (200 in FIG. 3) may be moved in both the positive direction and the negative direction of the second axis (Y-axis) by the third driver 320 and the fourth driver 330.

In one or more embodiments, the third driver 320 and the fourth driver 330 may be provided at positions intersecting the first driver (220 in FIG. 3) and the second driver (230 in FIG. 3) of the first driving part (200 in FIG. 3), respectively, with the image sensor (100 in FIG. 1 or 2) positioned at the center. For example, when the sensor actuator (10 in FIG. 1 or 2) is viewed from above, the first driver (220 in FIG. 3), the second driver (230 in FIG. 3), the third driver 320, and the fourth driver 330 may be provided adjacent to the four sides of the image sensor (100 in FIG. 1 or 2), respectively.

Hereinafter, a structure of a sensor actuator 10, including first to fourth drivers 220, 230, 320, and 330 according to one or more embodiments, will be described with reference to FIGS. 5 to 7.

Figure 5:
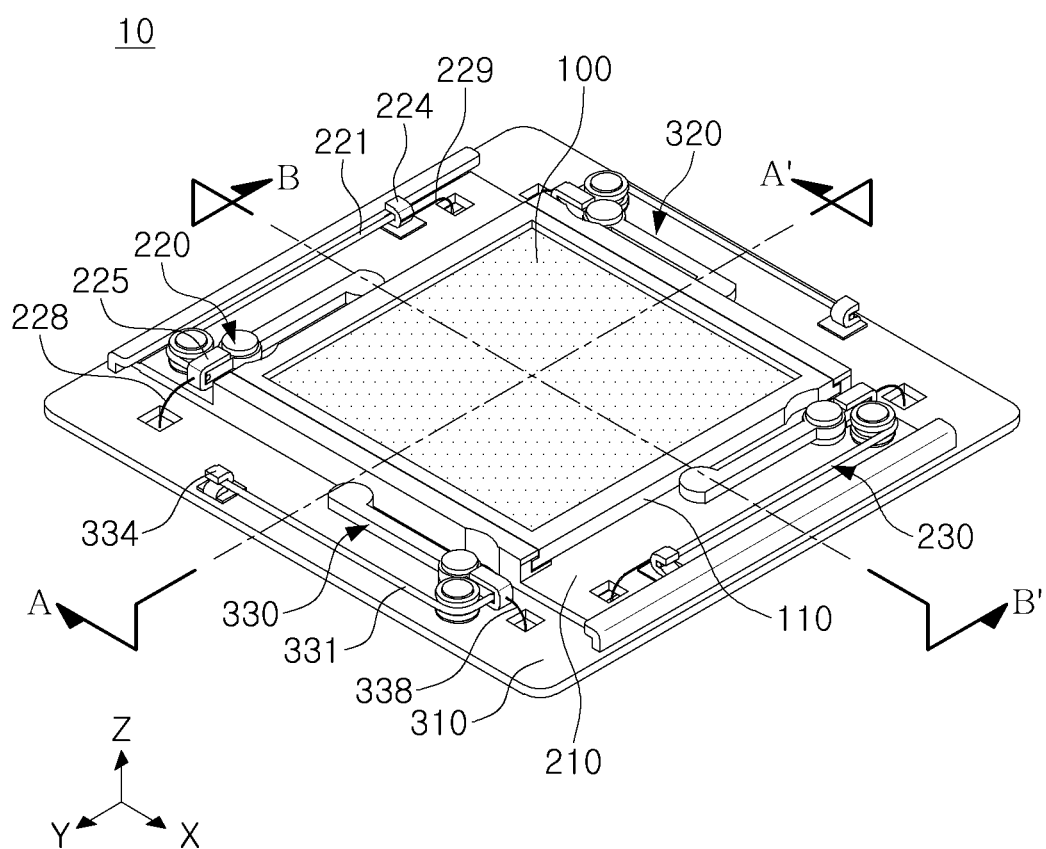
FIG. 5 is a perspective view of the sensor actuator, according to one or more embodiments.
Figure 6:
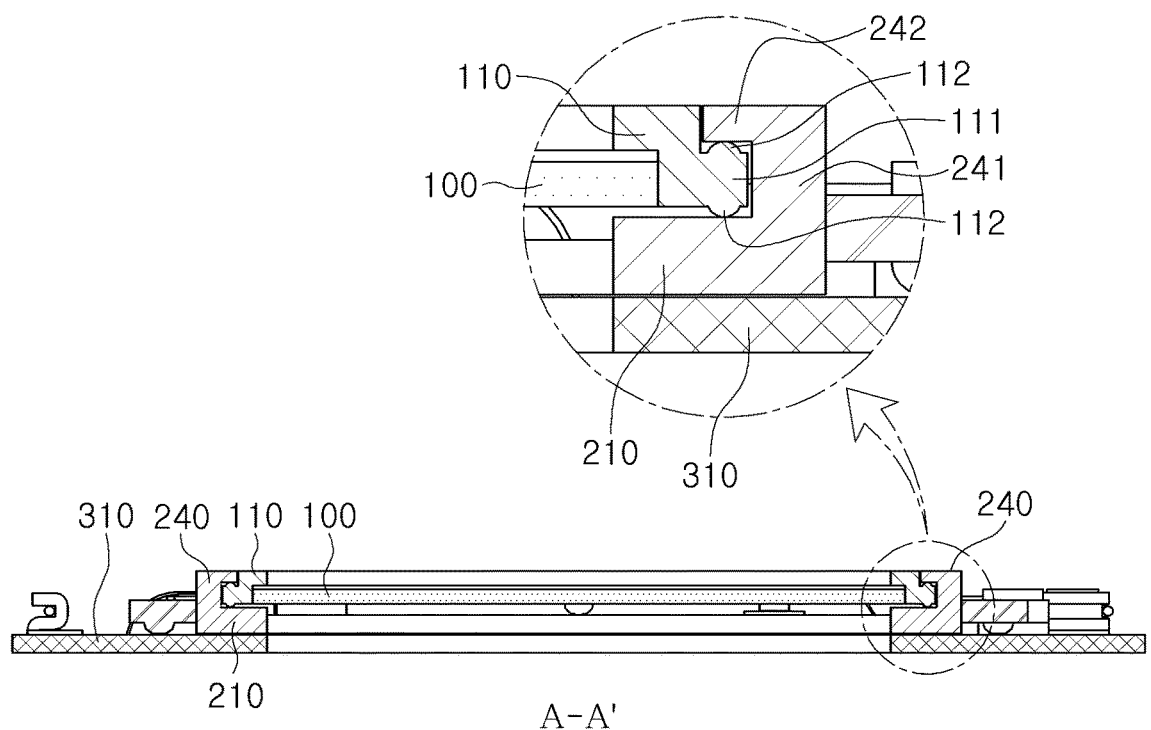
FIG. 6 is a cross-sectional view taken along line A-A' of FIG. 5.
Figure 7:
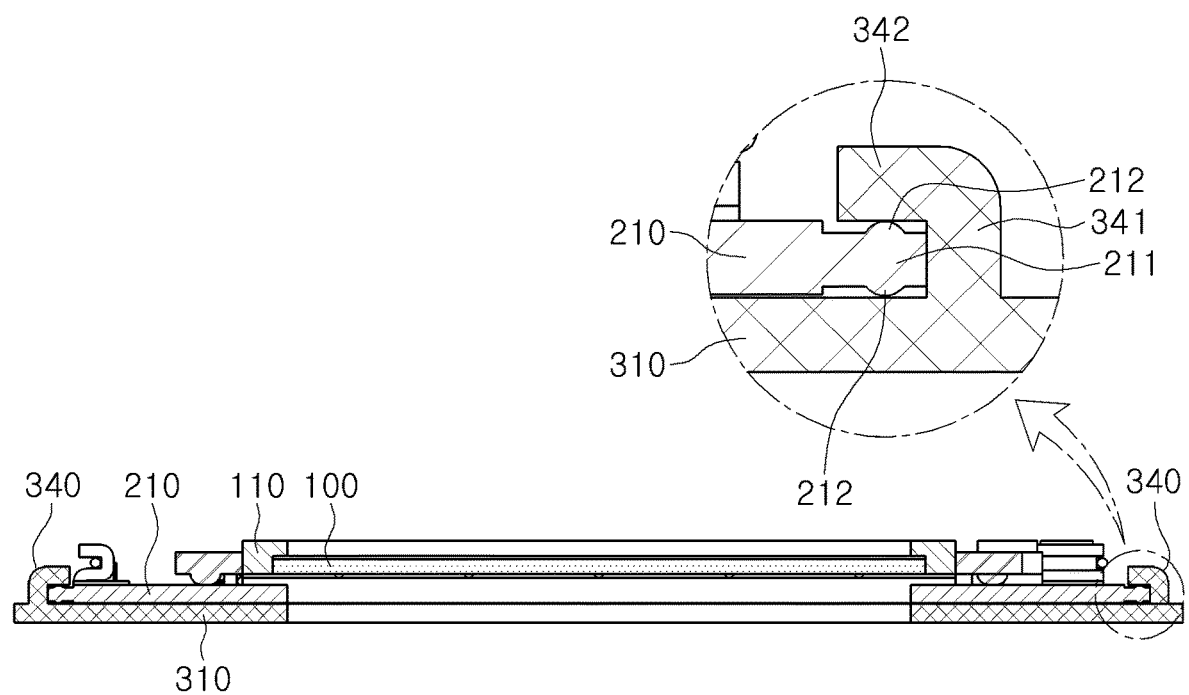
FIG. 7 is a cross-sectional view taken along line B-B' of FIG. 5.

FIG. 5 is a perspective view of the sensor actuator 10 according to one or more embodiments, FIG. 6 is a cross-sectional view taken along line A-A' of FIG. 5, and FIG. 7 is a cross-sectional view taken along line B-B' of FIG. 5.

The sensor actuator 10 and its components to be described below with reference to FIGS. 5 to 7 include the features of the sensor actuator 10 and its components described above with reference to FIGS. 1 to 4, and thus, the description thereof will not be repeated.

The sensor actuator 10, according to one or more embodiments, may include an image sensor 100 converting light incident in an optical axis direction (e.g., Z-axis direction) into an electrical signal, and one or more drivers 220, 230, 320, 330 capable of moving the image sensor 100.

The image sensor 100 may be accommodated in a sensor plate 110 having a hollow. The sensor plate 110 may be formed as a plate-shaped member having a hollow, and incident light may be incident on the image sensor 100 accommodated in the sensor plate 110 through the hollow. Meanwhile, the sensor plate 110 is not limited to the plate shape, and may be provided in various shapes. Alternatively, the sensor plate 110 may be integrally formed with the image sensor 100.

The sensor plate 110 provided with the image sensor 100 may be movably accommodated in the movable plate 210 of the first driving part (200 in FIG. 2 or 3). For example, as illustrated in FIG. 5, the sensor plate 110 provided with the image sensor 100 may be accommodated in the movable plate 210 to be movable in a direction (e.g., X-axis direction) perpendicular to the optical axis (Z-axis) along an upper surface of the movable plate 210.

The movable plate 210 may be movably accommodated in the base 310 of the second driving part (300 in FIG. 2 or 4). For example, as illustrated in FIG. 5, the movable plate 210 may be accommodated in the base 310 to be movable in a direction (e.g., Y-axis direction) perpendicular to the optical axis (Z-axis) along an upper surface of the base 310.

In one or more embodiments, the sensor plate 110, the movable plate 210, and the base 310 may be stacked in the optical axis direction (Z-axis direction). In addition, a circuit board (e.g., 400 in FIG. 1 or 2) electrically connected to the image sensor 100 or one or more drivers 220, 230, 320, and 330 may be further provided at a lower end of the base 310.

In one or more embodiments, a direction in which the sensor plate 110 is movable with respect to the movable plate 210 and a direction in which the movable plate 210 is movable with respect to the base 310 may intersect with each other. For example, as illustrated in FIG. 5, the sensor plate 110 may be movable with respect to the movable plate 210 in the direction of a first axis (X-axis) perpendicular to the optical axis (Z-axis), and the movable plate 210 may be movable with respect to the base 310 in the direction of a second axis (Y-axis) perpendicular to both the optical axis (Z-axis) and the first axis (X-axis). Accordingly, the image sensor 100 accommodated in the sensor plate 110 may be movable in both directions of the first axis (X-axis) and the second axis (Y-axis).

In one or more embodiments, the sensor actuator 10 may include one or more drivers 220, 230, 320, and 330 capable of moving the image sensor 100 in a direction of a plane (X-Y plane) perpendicular to the optical axis (Z-axis). For example, as illustrated in FIG. 5, the sensor actuator 10 may include a first driver 220 and a second driver 230, moving the image sensor 100 in the direction of the first axis (X-axis) perpendicular to the optical axis (Z-axis). In addition, the sensor actuator 10 may include a third driver 320 and a fourth driver 330, moving the image sensor 100 in the direction of the second axis (Y-axis) perpendicular to both the optical axis (Z-axis) and the first axis (X-axis).

In one or more embodiments, the plurality of drivers 220, 230, 320, and 330 included in the sensor actuator 10 may be provided at different positions. For example, as illustrated in FIG. 5, the four drivers 220, 230, 320, and 330 may be provided adjacent to the four sides of the image sensor 100, respectively.

In one or more embodiments, the plurality of drivers 220, 230, 320, and 330 included in the sensor actuator 10 may be provided on different layers of the sensor actuator 10. For example, as illustrated in FIG. 5, the first and second drivers 220 and 230 may be provided on the movable plate 210, and the third and fourth drivers 320 and 330 may be provided on the base 310, which is positioned on a lower side of the movable plate 210.

In one or more embodiments, the drivers 220, 230, 320, and 330 provided on the different layers of the sensor actuator 10 may be provided to move different components of the sensor actuator 10. For example, the plurality of drivers 220, 230, 320, and 330 may move different plates 110 and 210. That is, as illustrated in FIG. 5, the first driver 220 provided on the movable plate 210 may be provided to move the sensor plate 110, and the third driver 320 provided on the base 310 may be provided to move the movable plate 210. In one or more embodiments, when the movable plate 210 is moved by the third driver 320, the sensor plate 110 and the one or more drivers 220 and 230 may also move together with the movable plate 210. That is, one or more drivers 320 and 330 provided on the base 310 of the second driving part (300 in FIG. 4) may move the image sensor 100, the sensor plate 110, and the first driving part (200 in FIG. 3).

Each of the drivers 220, 230, 320, and 330 according to one or more embodiments may include a wire, a length of which changes when a current or voltage is applied thereto, and the wires included in the plurality of drivers 220, 230, 320, and 330 may be provided on different layers of the sensor actuator 10. For example, as illustrated in FIG. 5, a first wire 221 included in the first driver 220 may be provided on the movable plate 210, and a fourth wire 331 included in the fourth driver 330 may be provided on the base 310, which is positioned on the lower side of the movable plate 210.

Each of the plurality of wires included in the drivers 220, 230, 320, and 330, according to one or more embodiments, may move the image sensor in a direction different from a direction in which the length of the wire extends. For example, at least a portion of the first wire 221 of the first driver 220 may extend in the direction of the second axis (Y-axis), and the image sensor 100 may be moved in the direction of the first axis (X-axis) perpendicular to the second axis (Y-axis) according to the change in length of the first wire 221. In addition, at least a portion of the fourth wire 331 of the fourth driver 330 may extend in the direction of the first axis (X-axis), and the image sensor 100 may be moved in the direction of the second axis (Y-axis) perpendicular to the first axis (X-axis) according to the change in length of the fourth wire 331. Accordingly, according to one or more embodiments, the plurality of wires may be integratedly disposed in a small space of the sensor actuator 10 to move the image sensor in various directions.

The drivers 220, 230, 320, and 330, according to one or more embodiments, may be electrically connected to the circuit board (400 in FIG. 1 or 2) to receive a current or voltage from an external power source. For example, as illustrated in FIG. 5, one end and the other end of the first wire 221 included in the first driver 220 may be connected to cables 228 and 229, respectively, to be electrically connected to the circuit board (400 in FIG. 1 or 2) and the external power source (not shown). In a case in which a first fixing member 224 and a first connecting member 225 are formed of a conductive material, the cables 228 and 229 may be connected to the first fixing member 224 and the first connecting member 225, respectively, to be electrically connected to the first wire 221. Accordingly, a closed circuit may be configured to pass through the first wire 221 from the external power source (not shown), so that a voltage or current flows through the first wire 221. However, the connection structure between the first wire 221 and the external power source (not shown) is not limited to what has been described above. For example, at least one of the cables 228 and 229 connected to one end and the other end of the first wire 221, respectively, may be omitted. As illustrated in FIG. 5, one end of the fourth wire 331 may be connected to a fourth fixing member 334, and the fourth fixing member 334 may be electrically connected to the circuit board (400 in FIG. 1 or 2) in a direct manner. Accordingly, one end of the fourth wire 331 may be electrically connected to the circuit board (400 in FIG. 1 or 2) without a cable. Alternatively, the other end of the fourth wire 331 may be connected to the circuit board (400 in FIG. 1 or 2) through a cable 338.

The sensor plate 110 may be accommodated in the movable plate 210, and move in a direction (e.g., X-axis direction) perpendicular to the optical axis (Z-axis). In one or more embodiments, the movable plate 210 may have first guide portions 240 guiding the movement of the sensor plate 110. The first guide portion 240, according to one or more embodiments, may include a first extension portion 241 extending from the movable plate 210 in the direction of the optical axis (Z-axis), and a first bent portion 242 bent from the first extension portion 241 in a direction (e.g., Y-axis direction) intersecting the optical axis (Z-axis). The first extension portion 241 and the first bent portion 242 may be formed to be approximately perpendicular to each other, and the first bent portion 242 and the movable plate 210 may be formed to be approximately parallel to each other. That is, the first guide portion 240 may be formed to extend from the movable plate 210 in the direction of a first axis (e.g., X-axis) perpendicular to the optical axis (Z-axis), while having a '¬'-shaped cross section.

In one or more embodiments, the image sensor 100 or the sensor plate 110 provided with the image sensor 100 may be at least partially inserted between the first bent portion 242 and the movable plate 210 to slidably move in the direction of the first axis (X-axis) in which the first guide portion 240 extends. Alternatively, in one or more embodiments, the first guide portion 240 may have a first guide groove surrounded by the movable plate 210, the first extension portion 241, and the first bent portion 242, and the sensor plate 110 may be at least partially inserted into the first guide groove to slidably move in the direction of the first axis (X-axis).

In one or more embodiments, the first guide portions 240 may be provided at opposite edges of the movable plate 210, respectively. In this case, the first bent portions 242 included in the respective first guide portions 240 may be bent from the first extension portions 241 in directions to face each other.

In order to reduce friction between the sensor plate 110 and the movable plate 210, one or more friction-reducing members 112 may be provided at portions where the sensor plate 110 and the movable plate 210 abut on each other. In one or more embodiments, one or more friction-reducing members 112 may be provided on at least portions of the sensor plate 110 inserted between the first bent portion 242 and the movable plate 210. For example, as illustrated in FIG. 6, the sensor plate 110 may include a first insertion portion 111 inserted into the first guide portion 240 of the movable plate 210, and the friction-reducing members 112 may be provided on the first insertion portion 111. The friction reducing member 112 may be a protrusion-shaped member reducing a contact area between the sensor plate 110 and the movable plate 210. When provided in the protrusion shape, the friction-reducing members 112 may be provided to protrude upward and downward of the first insertion portion 111, respectively. Alternatively, the friction-reducing members 112 may be provided to protrude from the ends of the first insertion portion 111, respectively, in a direction perpendicular to the optical axis. In one or more embodiments, the friction-reducing members 112 may be integrally formed with the sensor plate 110. However, the friction-reducing member 112 is not limited thereto, and may be configured as, for example, a bush, a linear bearing, or a ball bearing. Alternatively, the friction-reducing member 112 may be provided on the first guide portion 240 of the movable plate 210.

In one or more embodiments, the sensor plate 110 may contact the movable plate 210 via the friction reducing member 112. That is, a portion of the sensor plate 110 other than the friction reducing member 112 may be spaced apart from the movable plate 210 at a predetermined interval. Accordingly, it is possible to form a very small friction force between the sensor plate 110 and the movable plate 210.

In one or more embodiments, a lubricating material reducing friction may be applied between the friction reducing member 112 and the first guide portion 240 or the movable plate 210.

In one or more embodiments, the movable plate 210 may be accommodated in the base 310 to move in a direction (e.g., Y-axis direction) perpendicular to the optical axis (Z-axis). In one or more embodiments, the base 310 may have second guide portions 340 guiding the movement of the movable plate 210. The second guide portion 340, according to one or more embodiments, may include a second extension portion 341 extending from the base 310 in the direction of the optical axis (Z-axis), and a second bent portion 342 bent from the second extension portion 341 in a direction (e.g., X-axis direction) intersecting the optical axis (Z-axis). The second extension portion 341 and the second bent portion 342 may be formed to be approximately perpendicular to each other, and the second bent portion 342 and the base 310 may be formed to be approximately parallel to each other. That is, second guide portion 340 may be formed to extend from the base 310 in the direction of a second axis (e.g., Y-axis) perpendicular to the optical axis (Z-axis), while having a '¬'-shaped cross section.

In one or more embodiments, at least a portion of the movable plate 210 may be inserted between the second bent portion 342 and the base 310 to slidably move in the direction of the second axis (Y-axis) in which the second guide portion 340 extends. Alternatively, in one or more embodiments, the second guide portion 340 may have a second guide groove surrounded by the base 310, the second extension portion 341, and the second bent portion 342, and the movable plate 210 may be at least partially inserted into the second guide groove to slidably move in the direction of the second axis (Y-axis).

In one or more embodiments, the second guide portions 340 may be provided at opposite edges of the base 310, respectively. In this case, the second bent portions 342 included in the respective second guide portions 340 may be bent from the second extension portions 341 in directions to face each other.

In order to reduce friction between the movable plate 210 and the base 310, one or more friction-reducing members 212 may be further provided at portions where the movable plate 210 and the base 310 abut on each other. In one or more embodiments, one or more friction-reducing members 212 may be provided on at least portions of the movable plate 210 inserted between the second bent portion 342 and the base 310. For example, as illustrated in FIG. 7, the movable plate 210 may include a second insertion portion 211 inserted into the second guide portion 340 of the base 310, and the friction-reducing members 212 may be provided on the second insertion portion 211. Alternatively, the friction-reducing members 212 may be provided on the second guide portion 340 of the base 310. The friction reducing member 212 provided between the movable plate 210 and the base 310 may have the same structure as the above-described friction reducing member 112 provided between the sensor plate 110 and the movable plate 210. For example, the friction-reducing member 212 may be provided on the second insertion portion 211, and may be a protrusion-shaped member provided to reduce a contact area between the movable plate 210 and the base 310.

In one or more embodiments, the movable plate 210 may contact the base 310 via the friction-reducing member 212. That is, a portion of the movable plate 210 other than the friction reducing member 212 may be spaced apart from the base 310 at a predetermined interval. Accordingly, it is possible to form a very small friction force between the movable plate 210 and the base 310.

In one or more embodiments, a lubricating material reducing friction may be applied between the friction reducing member 212 and the second guide portion 340 or the base 310.

Hereinafter, the driving of a driver (e.g., 220, 230, 320, or 330 in FIG. 5) according to one or more embodiments will be described with reference to FIGS. 8A and 8B.

Figure 8A:
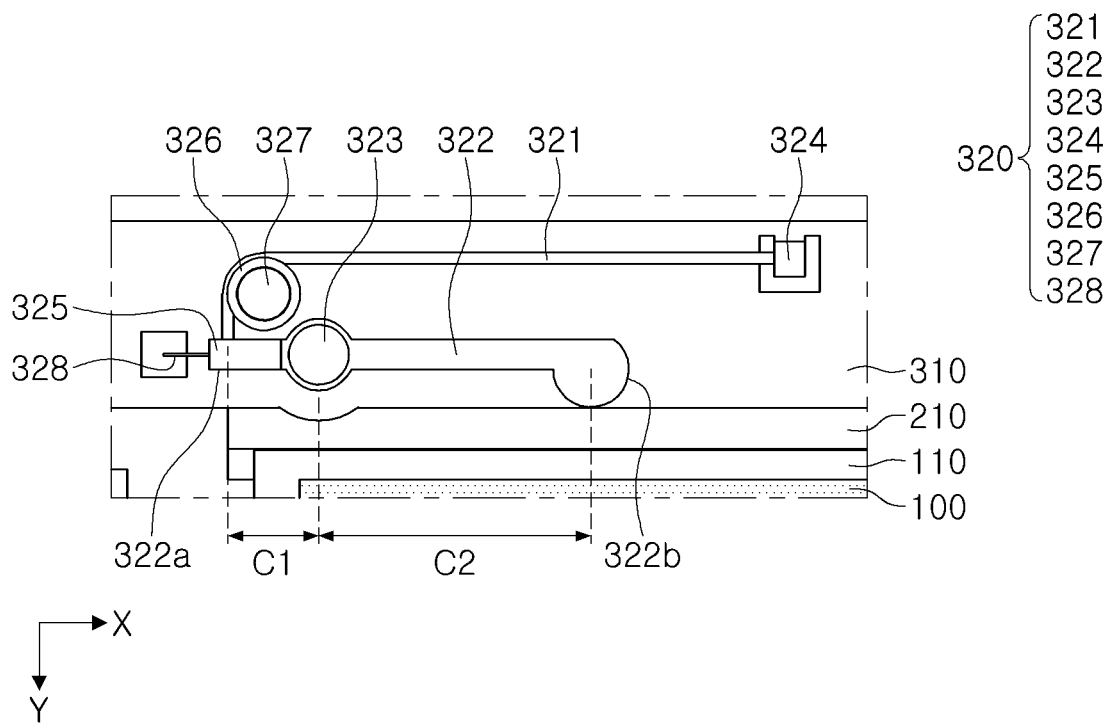
FIGS. 8A and 8B are reference views explaining the driving of a driver included in the sensor actuator, according to one or more embodiments.
Figure 8B:
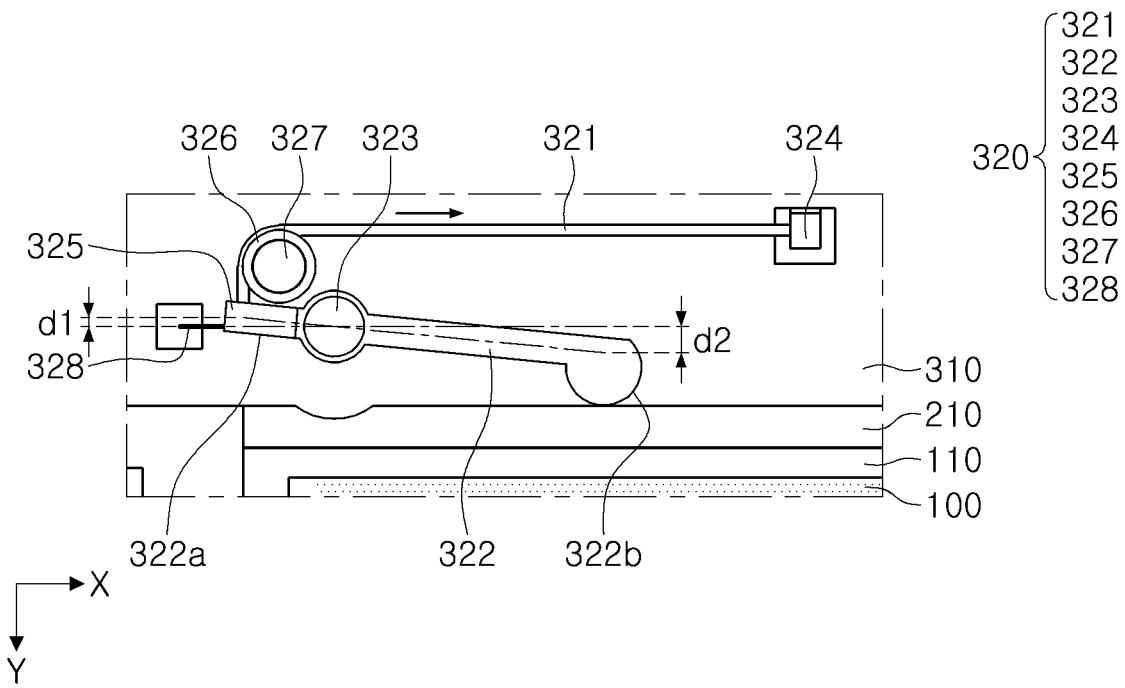

FIGS. 8A and 8B are reference views for explaining the driving of the driver (e.g., 220, 230, 320, or 330 in FIG. 5) included in the sensor actuator (e.g., 10 in FIG. 5) according to the one or more embodiments. The driver 320 to be described below with reference to FIGS. 8A and 8B corresponds to any one of the drivers 220, 230, 320, and 330 described above with reference to FIGS. 3 to 5, and thus, the overlapping description thereof will not be repeated. In addition, although only one driver (e.g., third driver) is described with reference to FIGS. 8A and 8B, the same may be applied to the other drivers (e.g., first, second, and fourth drivers) included in the sensor actuator. That is, the driver 320 to be described below may correspond to any one of the first to fourth drivers 220, 230, 320, and 330 described above with reference to FIGS. 3 to 5.

The driver 320, according to one or more embodiments, may include a wire 321 a length of which changes according to a control signal, a lever 322 connected to the wire 321 and rotating according to the change in length of the wire 321, and a lever shaft 323 forming a rotation axis of the lever 322.

The wire 321 may be electrically connected to an external power source (not shown) through a cable 328 to receive a current or voltage. At least a portion of the wire 321 may be fixed by a fixing member 324, and another portion of the wire 321 may be connected to the lever 322 by a connecting member 325 to be movable. Accordingly, when the length of the wire 321 contracts, the wire 321 may pull the lever 322 connected thereto through the connecting member 325, so that the lever 322 rotates.

The lever 322 may include a connection portion 322a connected to the wire 321 and a contact portion 322b contacting the movable plate 210 or the sensor plate 110. The connection portion 322a of the lever 322 may move together with the wire 321 according to the change in length of the wire 321, and the contact portion 322b may move the image sensor 100 in a predetermined direction (e.g., Y-axis direction) according to the rotation of the lever 322.

In one or more embodiments, the rotation axis of the lever 322 may be provided between the connection portion 322a and the contact portion 322b. In this case, a distance from the connection portion 322a to the rotation axis may differ from the distance from the contact portion 322b to the rotation axis. For example, when the distance from the rotation axis formed by the lever shaft 323 to the connection portion 322a is referred to as a first distance C1, and the distance from the rotation axis to the contact portion 322b is referred to as a second distance C2, the first distance C1 may be smaller than the second distance C2 as illustrated in FIG. 8A. Since the first distance C1 is smaller than the second distance C2, when the lever 322 rotates, an arc trajectory drawn by the connection portion 322a may be shorter than that drawn by the contact portion 322b.

In addition, since the second distance C2 is larger than the first distance C1, a moving distance of the contact portion 322b rotating according to the change in length of the wire 321 may be greater than an amount of the change in length of the wire 321. Thus, a moving distance of the image sensor 100 moved by the contact portion 322b of the lever 322 may be relatively larger than the amount of the change in length of the wire 321. For example, in a case in which a predetermined voltage is applied to the wire 321, when the amount of the change in length of the wire 321 is referred to as a third distance d1, and the moving distance of the image sensor 100 according to the change in length of the wire 321 is referred to as a fourth distance d2, the fourth distance d2 may be larger than the third distance d1. That is, in the sensor actuator (10 in FIG. 1, 2, or 5) according to one or more embodiments, through the structure of the lever 322 in which the first distance C1 and the second distance C2 are different from each other, the moving distance of the image sensor 100 may have a larger value than the amount of the change in length of the wire 321. Accordingly, even if the amount of the change in length of the wire 321 is small, it is possible to secure a sufficient movement stroke of the image sensor 100. In this way, the sensor actuator (10 in FIG. 1, 2, or 5), according to one or more embodiments, may more effectively perform an optical image stabilization function using the movement of the image sensor 100.

The sensor actuator (10 in FIG. 1, 2, or 5), according to one or more embodiments, may include a plurality of drivers 220, 230, 320, and 330 moving the image sensor 100 in different directions. Hereinafter, the driving of the plurality of drivers 220, 230, 320, and 330 will be described with reference to FIGS. 9A to 9F.

FIGS. 9A to 9F are reference views for explaining the driving of a sensor actuator 10 according to one or more embodiments. The sensor actuator 10 to be described below with reference to FIGS. 9A to 9F includes all the features of the sensor actuator 10 described above with reference to FIGS. 1 to 8, and thus, the overlapping description thereof will not be repeated.

Figure 9A:
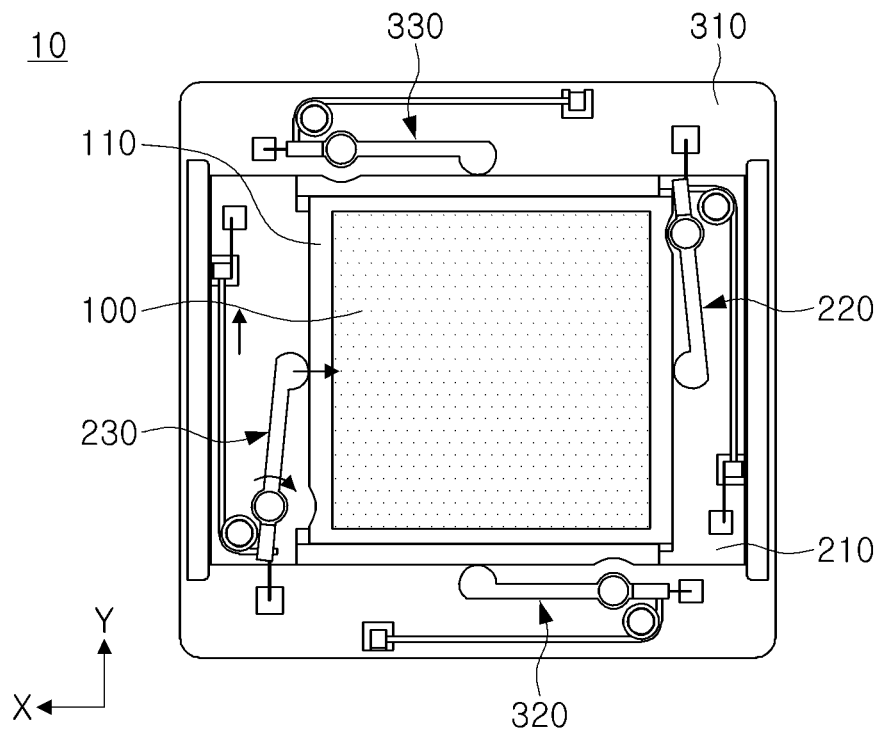
FIGS. 9A to 9F are reference views explaining the driving of the sensor actuator, according to one or more embodiments.

The sensor actuator 10, according to one or more embodiments, may include a plurality of drivers 220, 230, 320, and 330 receiving electrical energy from an external power source (not shown) to move an image sensor 100. For example, as illustrated in FIG. 9A, the sensor actuator 10 may include first and second drivers 220 and 230 capable of moving the image sensor 100 in the direction of a first axis (X-axis) perpendicular to an optical axis (Z-axis), and may include third and fourth drivers 320 and 330 capable of moving the image sensor 100 in the direction of a second axis (Y-axis) perpendicular to the first axis (X-axis).

Figure 9B:
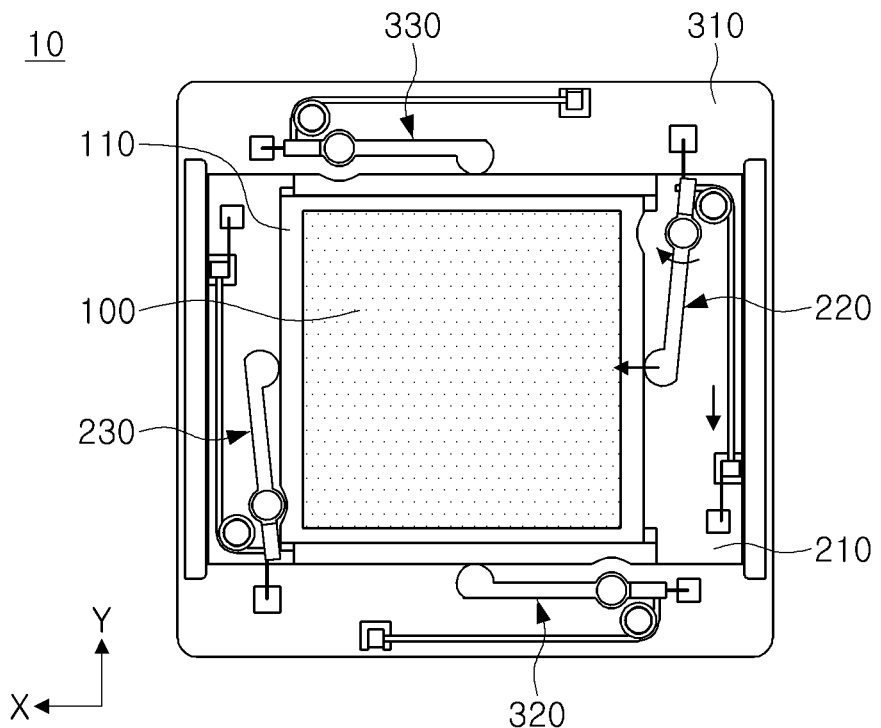

The first driver 220 and the second driver 230 may move a sensor plate 110 provided with the image sensor 100. For example, as illustrated in FIGS. 9A and 9B, the first driver 220 or the second driver 230 may move the sensor plate 110 in the direction of the first axis (X-axis). The first driver 220 and the second driver 230 may be provided on the movable plate 210, and may be controlled independently of each other. For example, one of the first driver 220 and the second driver 230 may be driven, and the other one may not be driven. As the first driver 220 is driven, the image sensor 100 may move in a positive direction of the first axis (X-axis), and as the second driver 230 is driven, the image sensor 100 may move in a negative direction of the first axis (X-axis). In one or more embodiments, the first driver 220 and the second driver 230 may be driven simultaneously or sequentially. For example, the first driver 220 and the second driver 230 may receive currents or voltages of different magnitudes simultaneously or sequentially to precisely move the image sensor 100 to a desired position on the first axis (X-axis).

Figure 9C:
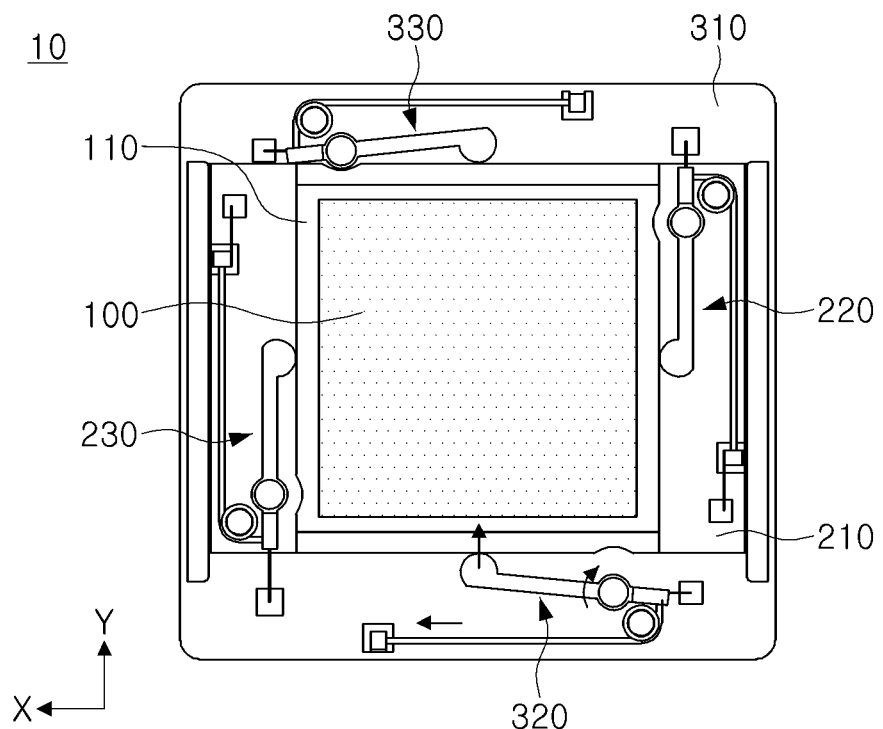
Figure 9D:
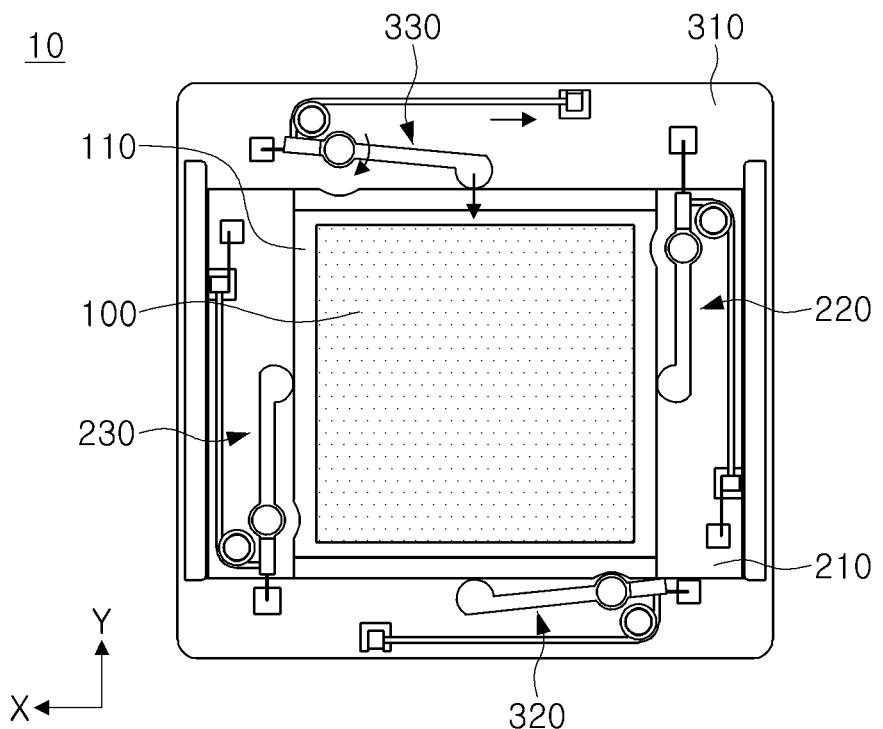

In one or more embodiments, the third driver 320 and the fourth driver 330 may be provided to move the movable plate 210 in which the image sensor 100 is accommodated. As the movable plate 210 is moved in the direction of the second axis (Y-axis) by the third driver 320 and the fourth driver 330, the image sensor 100 may also move together with the movable plate 210. For example, as illustrated in FIGS. 9C and 9D, the third driver 320 and the fourth driver 330 may move the movable plate 210 in the direction of the second axis (Y-axis). As the movable plate 210 moves, the first driver 220, the second driver 230, and the sensor plate 110 provided on the movable plate 210 may also move together. The third driver 320 and the fourth driver 330 may be provided on the base 310, and may be controlled independently of each other. For example, one of the third driver 320 and the fourth driver 330 may be driven, and the other one may not be driven. As the third driver 320 is driven, the movable plate 210 and the image sensor 100 may move in a positive direction of the second axis (Y-axis), and as the fourth driver 330 is driven, the movable plate 210 and the image sensor 100 may move in a negative direction of the second axis (Y-axis). In one or more embodiments, the third driver 320 and the fourth driver 330 may be driven simultaneously or sequentially. For example, the third driver 320 and the fourth driver 330 may receive currents or voltages of different magnitudes simultaneously or sequentially to precisely move the image sensor 100 to a desired position on the second axis (Y-axis).

Figure 9E:
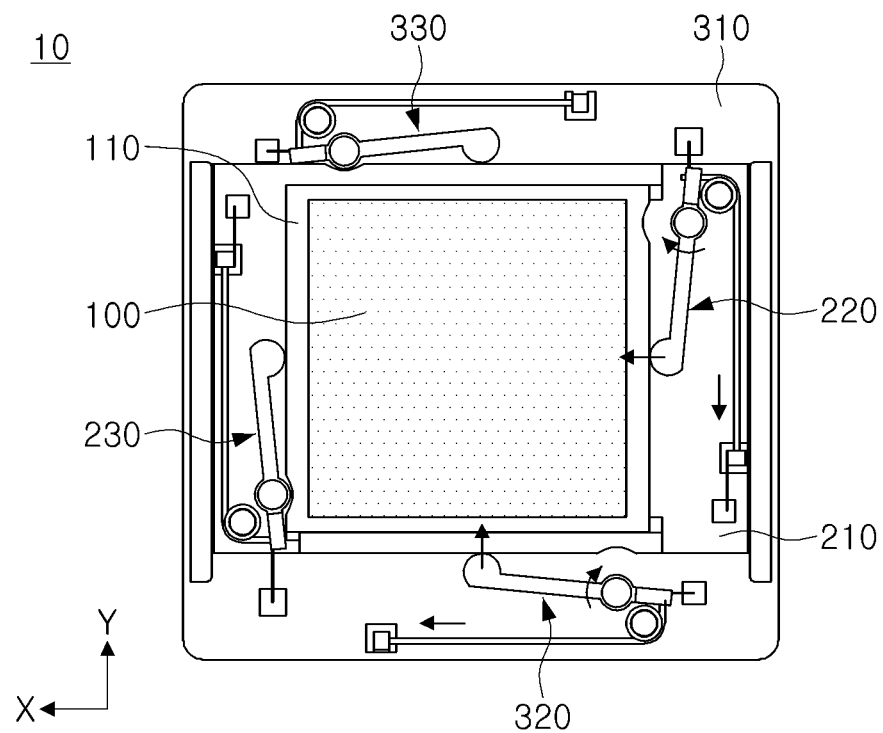
Figure 9F:
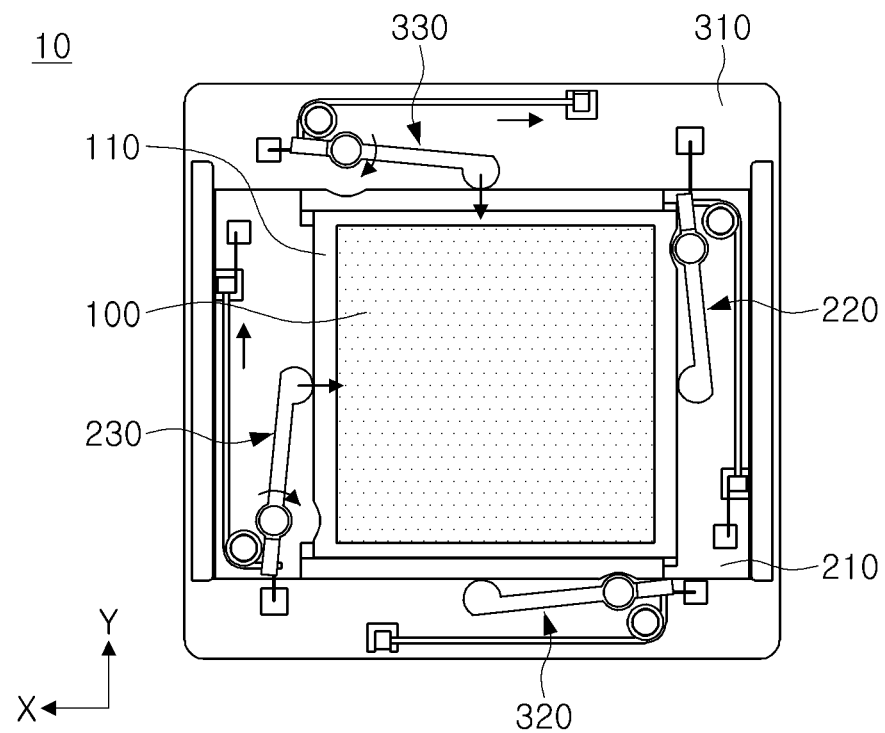

In one or more embodiments, at least some of the first to the fourth drivers 220, 230, 320, and 330 may be driven simultaneously or sequentially. Accordingly, the image sensor 100 may move in various directions on a plane (X-Y plane) perpendicular to the optical axis (Z-axis). For example, as illustrated in FIG. 9E, the first driver 220 and the third driver 320 may be driven simultaneously. That is, the third driver 320 may move the movable plate 210 in the positive direction of the second axis (Y-axis), and at the same time, the first driver 220 may move the sensor plate 110 in the positive direction of the first axis (X-axis). Accordingly, the image sensor 100 may quickly move in a diagonal direction between the positive direction of the first axis (X-axis) and the positive direction of the second axis (Y-axis) to perform an optical image stabilization function. Alternatively, as illustrated in FIG. 9F, the second driver 230 and the fourth driver 330 may be driven simultaneously, so that the image sensor 100 is quickly moved in a diagonal direction between the negative direction of the first axis and the negative direction of the second axis (Y-axis) to perform an optical image stabilization function.

In the sensor actuator 10, according to one or more embodiments, the plurality of drivers 220, 230, 320, and 330 moving the image sensor 100 in different directions may be provided on different layers. For example, the third driver 320 and the fourth driver 330 may be provided on the base 310, and the first driver 220 and the second driver 230 may be provided on the movable plate 210, which is positioned on an upper side of the base 310. Accordingly, even though the movable plate 210 is moved by the third driver 320 or the fourth driver 330, the first driver 220 and the second driver 230 may maintain the same positions with respect to the movable plate 210 and the image sensor 100. That is, relative positions between the first and second drivers 220 and 230 and the image sensor 100 may remain unchanged. Accordingly, the first driver 220 and the second driver 230 may precisely move the image sensor 100 regardless of whether the third driver 320 or the fourth driver 330 is driven, thereby accurately performing an optical image stabilization function.

As set forth above, the sensor actuator and the camera module, including the same according to one or more embodiments, can move the image sensor in a direction intersecting the optical axis to implement an optical image stabilization function.

Since the sensor actuator and the camera module, including the same according to one or more embodiments, can move the image sensor using a wire, a length of which changes, it is possible to provide a sensor actuator and a camera module having high operational reliability with a simple structure.

Since the sensor actuator and the camera module, including the same according to one or more embodiments, can move the image sensor using a wire, a length of which changes, it is possible to reduce the power consumption desired for moving the image sensor.

The sensor actuator and the camera module, including the same according to one or more embodiments, can move the image sensor in a direction intersecting the optical axis using a very small amount of a change in length of the wire.

Since the sensor actuator and the camera module, including the same according to one or more embodiments, can move the image sensor using a wire, a length of which changes, it is possible to minimize electromagnetic interference in another electronic component.

The sensor actuator and the camera module, including the same according to one or more embodiments, are capable of precisely and quickly moving the image sensor by adjusting the speed and an amount of the change in length of the wire.

The present disclosure may solve at least some of the aforementioned problems of the related art, and an object of the present disclosure is to provide a sensor actuator capable of moving an image sensor to implement an autofocusing function, an optical image stabilization function, or the like with a simple structure, while reducing power consumption, or a camera module including the same.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A sensor actuator comprising:
an image sensor configured to convert incident light into an electrical signal; and
first and second driving parts, configured to move the image sensor in first and second directions, respectively, each of the first and second driving parts comprising one or more drivers,
wherein the one or more drivers further comprise:
a lever, connected to the wire, configured to rotate around a rotation axis based on the change in length of the wire to move the image sensor;
wherein the second driving part is configured to move the image sensor and the first driving part together; and
the first and second directions are different from each other.

2. The sensor actuator of claim 1, wherein the one or more drivers further comprise:
a lever shaft forming the rotation axis.

3. The sensor actuator of claim 1, wherein a moving distance of the image sensor based on the change in length of the wire is greater than an amount of the change in length of the wire.

4. The sensor actuator of claim 2, wherein the lever comprises a connection portion connected to the wire, and a contact portion contacting a plate provided with the image sensor, and
the rotation axis is between the connection portion and the contact portion.

5. The sensor actuator of claim 4, wherein in the lever, a distance from the connection portion to the rotation axis is smaller than a distance from the contact portion to the rotation axis.

6. The sensor actuator of claim 4, wherein the contact portion of the lever has a curved surface.

7. The sensor actuator of claim 1, wherein the first direction is a first axis perpendicular to an optical axis, and
the second direction is a second axis perpendicular to both the optical axis and the first axis.

8. The sensor actuator of claim 7, wherein the first driving part comprises:
a movable plate configured to movably accommodate the image sensor;
a first lever, disposed on the movable plate, configured to move the image sensor in a positive direction of the first axis; and
a second lever, disposed on the movable plate, configured to move the image sensor in a negative direction of the first axis.

9. The sensor actuator of claim 8, further comprising a sensor plate surrounding a perimeter of the image sensor,
wherein the movable plate comprises a first guide portion extending in the direction of the first axis,
the first guide portion comprises a first extension portion extending from the movable plate in a direction of the optical axis, and a first bent portion bent from the first extension portion in a direction intersecting the optical axis, and
at least a portion of the sensor plate is inserted between the first bent portion and the movable plate to move the sensor plate in the direction of the first axis.

10. The sensor actuator of claim 9, further comprising a friction reducing member on the portion of the sensor plate inserted between the first bent portion and the movable plate.

11. The sensor actuator of claim 8, wherein the second driving part comprises:
a base configured to movably accommodate the movable plate;
a third lever, disposed on the base, configured to move the movable plate in a positive direction of the second axis; and
a fourth lever, disposed on the base, configured to move the movable plate in a negative direction of the second axis.

12. The sensor actuator of claim 11, wherein the base comprises a second guide portion extending in the direction of the second axis,
the second guide portion comprises a second extension portion extending from the base in a direction of the optical axis, and a second bent portion bent from the second extension portion in a direction intersecting the optical axis, and
at least a portion of the movable plate is inserted between the second bent portion and the base to move the movable plate in the direction of the second axis.

13. The sensor actuator of claim 12, further comprising a friction reducing member disposed on the portion of the movable plate inserted between the second bent portion and the base.

14. The sensor actuator of claim 11, wherein the first, second, third, and fourth drivers are driven independently of each other.

15. A camera module comprising:
a lens module comprising one or more lenses; and
a sensor actuator, configured to receive incident light passing through the lens module, comprising:
an image sensor, a movable plate, and a base stacked in a direction of an optical axis;
a first wire configured to move the image sensor with respect to the movable plate in a direction of a first axis perpendicular to the optical axis; and
a second wire configured to move the movable plate with respect to the base in a direction of a second axis perpendicular to both the optical axis and the first axis,
wherein the first wire is disposed on the movable plate, and
the second wire is disposed on the base,
wherein the image sensor is movable along the upper surface of the movable plate, and
wherein the movable plate is movable along with the upper surface of the base.

16. The camera module of claim 15, wherein at least a portion of the first wire is disposed to extend in the direction of the second axis, and
at least a portion of the second wire is disposed to extend in the direction of the first axis.

* * * * *